(12) United States Patent  
Bhandarkar et al.

(10) Patent No.: US 9,079,986 B2  
(45) Date of Patent: Jul. 14, 2015

(54) POLYOLEFIN PRODUCTION WITH DIFFERENT DILUENTS IN MULTIPLE POLYMERIZATION REACTORS

(71) Applicant: Chevron Phillips Chemical Company, LP, The Woodlands, TX (US)

(72) Inventors: Maruti Bhandarkar, Kingwood, TX (US); Elizabeth Ann Benham, Spring, TX (US); Rebecca A. Gonzales, Houston, TX (US); Scott E. Kufeld, Houston, TX (US); Joel A Mutchler, Kingwood, TX (US); Catherine M. Gill, Kingwood, TX (US); Thanh T. Nguyen, Sugar Land, TX (US); Timothy O. Odi, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 14/315,418

(22) Filed: Jun. 26, 2014

(65) Prior Publication Data

US 2014/0309382 A1   Oct. 16, 2014

Related U.S. Application Data

(62) Division of application No. 13/795,033, filed on Mar. 12, 2013, now Pat. No. 8,822,608.

(51) Int. Cl.

| C08F 2/00 | (2006.01) |
| C08F 210/00 | (2006.01) |
| C08F 110/02 | (2006.01) |
| B01J 19/18 | (2006.01) |
| C08F 2/01 | (2006.01) |
| B01J 19/00 | (2006.01) |

(52) U.S. Cl.  
CPC ............ *C08F 110/02* (2013.01); *B01J 19/1818* (2013.01); *B01J 19/1837* (2013.01); *B01J 2204/005* (2013.01)

(58) Field of Classification Search  
CPC .............. C08F 2/01; C08F 10/02; C08F 2/14; C08F 2/001; C08F 110/02; C08F 210/16; C08F 2500/12; C08F 2500/24; B01J 19/00; B01J 9/0055; B01J 8/20; B01J 8/388; B01J 2208/00283; B01J 2219/00006; B01J 2219/0033  
USPC ............................. 526/64, 348, 352; 422/132  
See application file for complete search history.

(56) References Cited

U.S. PATENT DOCUMENTS

| 4,121,029 | A | 10/1978 | Irvin et al. |
| 4,163,837 | A | 8/1979 | Rush |
| 4,525,684 | A | 6/1985 | Majefski |
| 6,221,982 | B1 | 4/2001 | Debras et al. |
| 6,291,601 | B1 | 9/2001 | Debras |
| 6,420,497 | B1 | 7/2002 | Kufeld et al. |
| 6,596,823 | B2 * | 7/2003 | Marissal ..................... 526/70 |
| 6,921,804 | B2 | 7/2005 | Mutchler et al. |
| 6,924,340 | B2 | 8/2005 | McGrath |
| 7,396,892 | B2 | 7/2008 | McGrath |
| 7,741,430 | B2 | 6/2010 | Walworth |
| 8,128,877 | B2 | 3/2012 | Mcelvain et al. |

* cited by examiner

*Primary Examiner* — William Cheung

(57) ABSTRACT

A system and method for producing polyolefin, including a polyolefin reactor system having: a first reactor to produce a first reactor discharge stream having a first polyolefin and a first diluent; and a second reactor to receive at least a portion of the first reactor discharge stream and to produce a second reactor discharge stream having a second polyolefin and a second diluent, wherein the second diluent is different than the first diluent.

12 Claims, 3 Drawing Sheets

POLYOLEFIN PRODUCTION WITH DIFFERENT DILUENTS IN MULTIPLE POLYMERIZATION REACTORS

CROSS-REFERENCE TO RELATED APPLICATIONS

This application claims the benefit of U.S. patent application Ser. No. 13/795,033, filed Mar. 12, 2013, entitled "Polyolefin Production with Different Diluents in Multiple Polymerization Reactors", now U.S. Pat. No. 8,822,608.

BACKGROUND

1. Field of the Invention

The present invention relates generally to polyolefin production with multiple polymerization reactors and, more particularly, to employing different diluents in respective polymerization reactors in polyolefin production with multiple polymerization reactors to facilitate production of different polyolefin in the respective polymerization reactors.

2. Description of the Related Art

This section is intended to introduce the reader to aspects of art that may be related to aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As chemical and petrochemical technologies have advanced, the products of these technologies have become increasingly prevalent in society. In particular, as techniques for bonding simple molecular building blocks into longer chains (or polymers) have advanced, the polymer products, typically in the form of various plastics, have been increasingly incorporated into everyday items. Polyolefin polymers such as polyethylene, polypropylene, and their copolymers, are used for piping, retail and pharmaceutical packaging, food and beverage packaging, plastic bags, toys, carpeting, various industrial products, automobile components, appliances and other household items, and so forth.

Specific types of polyolefins, such as high-density polyethylene (HDPE), have particular applications in the manufacture of blow-molded and injection-molded goods, such as food and beverage containers, film, and plastic pipe. Other types of polyolefins, such as low-density polyethylene (LDPE), linear low-density polyethylene (LLDPE), isotactic polypropylene (iPP), and syndiotactic polypropylene (sPP) are also suited for similar applications. The mechanical requirements of the application, such as tensile strength and density, and/or the chemical requirements, such thermal stability, molecular weight, and chemical reactivity, typically determine what type of polyolefin is suitable.

One benefit of polyolefin construction, as may be deduced from the list of uses above, is that it is generally non-reactive with goods or products with which it is in contact. This allows polyolefin products to be used in residential, commercial, and industrial contexts, including food and beverage storage and transportation, consumer electronics, agriculture, shipping, and vehicular construction. The wide variety of residential, commercial and industrial uses for polyolefins has translated into a substantial demand for raw polyolefin which can be extruded, injected, blown or otherwise formed into a final consumable product or component.

To satisfy this demand, various processes exist by which olefins may be polymerized to form polyolefins. These processes may be performed at or near petrochemical facilities, which provide ready access to the short-chain olefin molecules (monomers and comonomers), such as ethylene, propylene, butene, pentene, hexene, octene, decene, and other building blocks of the much longer polyolefin polymers. These monomers and comonomers may be polymerized in a liquid-phase polymerization reactor and/or gas-phase polymerization reactor. As polymer chains develop during polymerization in the reactor, solid particles known as "fluff" or "flake" or "powder" are produced in the reactor.

The fluff may possess one or more melt, physical, rheological, and/or mechanical properties of interest, such as density, melt index (MI), melt flow rate (MFR), comonomer content, molecular weight, crystallinity, and so on. Different properties for the fluff may be desirable depending on the application to which the polyolefin fluff or subsequently pelletized polyolefin is to be applied. Selection and control of the reaction conditions within the reactor, such as temperature, pressure, chemical concentrations, polymer production rate, catalyst type, and so forth, may affect the fluff properties.

In addition to the one or more olefin monomers, a catalyst (e.g., Ziegler-Natta, metallocene, chromium-based, post-metallocene, nickel, etc.) for facilitating the polymerization of the monomers may be added to the reactor. For example, the catalyst may be a particle added via a reactor feed stream and, once added, suspended in the fluid medium within the reactor. Unlike the monomers, catalysts are generally not consumed in the polymerization reaction. Moreover, an inert hydrocarbon, such as isobutane, propane, n-pentane, i-pentane, neopentane, n-hexane, and/or heptane, and so on, may be added to the reactor and utilized as a diluent to carry the contents of the reactor. However, some polymerization processes may not employ a separate diluent, such as in the case of selected examples of polypropylene production where the propylene monomer itself acts as the diluent. In general, the diluent may facilitate circulation of the polymer slurry in the reactor, heat removal from the polymer slurry in the reactor, and so on.

The slurry discharge of the reactor typically includes the polymer fluff as well as non-polymer components such as unreacted olefin monomer (and comonomer), diluent, and so forth. This discharge stream is generally processed, such as by a diluent/monomer recovery system (e.g. flash vessel or separator vessel, purge column, etc.) to separate the non-polymer components from the polymer fluff. The recovered diluent, unreacted monomer, and other non-polymer components from the recovery system may be treated and recycled to the reactor, for example. As for the recovered polymer (solids), the polymer may be treated to deactivate residual catalyst, remove entrained or dissolved hydrocarbons, dry the polymer, and pelletize the polymer in an extruder, and so forth, before the polymer is sent to customer.

In some circumstances, to increase capacity of a polyolefin polymerization line or to achieve certain desired polymer characteristics, more than one polymerization reactor may be employed, with each reactor having its own set of conditions. In certain examples, the reactors (e.g., loop reactors) may be connected in series, such that the polymer slurry from one reactor may be transferred to a subsequent reactor, and so forth, until a polyolefin polymer is produced discharging from the final or terminal reactor with the desired set of characteristics. The respective reactor conditions including the polymerization recipe can be set and maintained such that the polyolefin (e.g., polyethylene, polypropylene) polymer product is monomodal, bimodal, or multimodal, and having polyolefin portions of different densities, and so on.

The competitive business of polyolefin production drives manufacturers in the continuous improvement of their processes in order to improve operability, lower production costs, improve product quality, increase operating flexibility and capability, expand product slate variety and capability, and so on. In an industry where billions of pounds of polyolefins are produced per year, small incremental improvements, such as in heat transfer and reduced fouling, can increase operability, product quality, and product variety. Such improvements can result in significant economic benefit, increased sales, larger market share, greater price margins and netback, and so forth.

SUMMARY OF THE INVENTION

An aspect of the invention relates to a polyolefin reactor system including: a first reactor configured to produce a first reactor discharge stream having a first polyolefin and a first diluent composition; and a second reactor configured to receive at least a portion of the first reactor discharge stream and to produce a second reactor discharge stream having a second polyolefin and a second diluent composition, wherein the second diluent composition is different than the first diluent composition.

Another aspect of the invention relates to a polyolefin reactor system including: a first reactor configured to receive a first diluent and to produce a first reactor discharge having the first diluent and a first polyolefin; a separator configured to receive at least a portion of the first reactor discharge and to form (1) a recycle stream comprising the first diluent and (2) a separator product stream comprising the first polyolefin; a second reactor configured to receive a second diluent and the diluent separator product stream, and to produce a second reactor discharge having the second diluent and a second polyolefin; and wherein the first diluent is different than the second diluent.

Yet another aspect of the invention relates to a polyolefin reactor system including: a first polymerization reactor configured to polymerize olefin monomer in the presence of a first diluent, and to discharge continuously a transfer slurry having a first polyolefin and the first diluent; a separation system configured to receive the transfer slurry and to discharge a recycle stream having the first diluent, and to discharge a fluff slurry having the first polyolefin; and a second polymerization reactor configured to receive the fluff slurry from the separation system, polymerize olefin monomer in the presence of a second diluent, and discharge a product slurry having a second polyolefin, wherein the second diluent is different than the first diluent.

Yet another aspect of the invention relates to a polymerization reactor system including: a first loop reactor configured to polymerize olefin monomer in a first diluent to produce a first polyolefin, and to discharge continuously a transfer slurry having the first polyolefin and the first diluent; a separation system configured to remove the first diluent from the transfer slurry, and to discharge a fluff slurry having the first polyolefin to a second loop reactor; the second loop reactor configured to polymerize olefin monomer in a second diluent to produce a second polyolefin, and to discharge a product slurry having a product polyolefin having the first polyolefin and the second polyolefin; and wherein the first diluent is different than the second diluent.

Yet another aspect of the invention relates to a method of operating a polyolefin reactor system, including: polymerizing olefin in a first diluent in a first reactor to form a first polyolefin; discharging continuously from the first reactor a transfer slurry having the first polyolefin and the first diluent; processing the transfer slurry through a separator to form (1) a recycle stream having the first diluent and (2) a fluff slurry having the first polyolefin; feeding the fluff slurry to a second reactor; polymerizing olefin in a second diluent in the second reactor to form a second polyolefin; discharging from the second reactor a product slurry comprising the first polyolefin, the second polyolefin, and the second diluent; and wherein the first diluent and the second diluent are different.

Yet another aspect of the invention relates to a method of operating a polyolefin reactor system, including: polymerizing olefin in a first diluent in a first reactor to form an intermediate polyolefin; discharging continuously from the first reactor a transfer slurry comprising the intermediate polyolefin and the first diluent; processing the transfer slurry to remove first diluent and to provide a fluff slurry comprising the intermediate polyolefin and less first diluent than in the transfer slurry; feeding the fluff slurry to a second reactor; polymerizing olefin in a second diluent in a second reactor to form a product polyolefin; discharging from the second reactor a product slurry comprising the product polyolefin; and wherein the first diluent and the second diluent are different.

BRIEF DESCRIPTION OF THE DRAWINGS

Advantages of the invention may become apparent to one of skill in the art upon reading the following detailed description and upon reference to the drawings in which.

DETAILED DESCRIPTION OF SPECIFIC EMBODIMENTS

Figure 1:
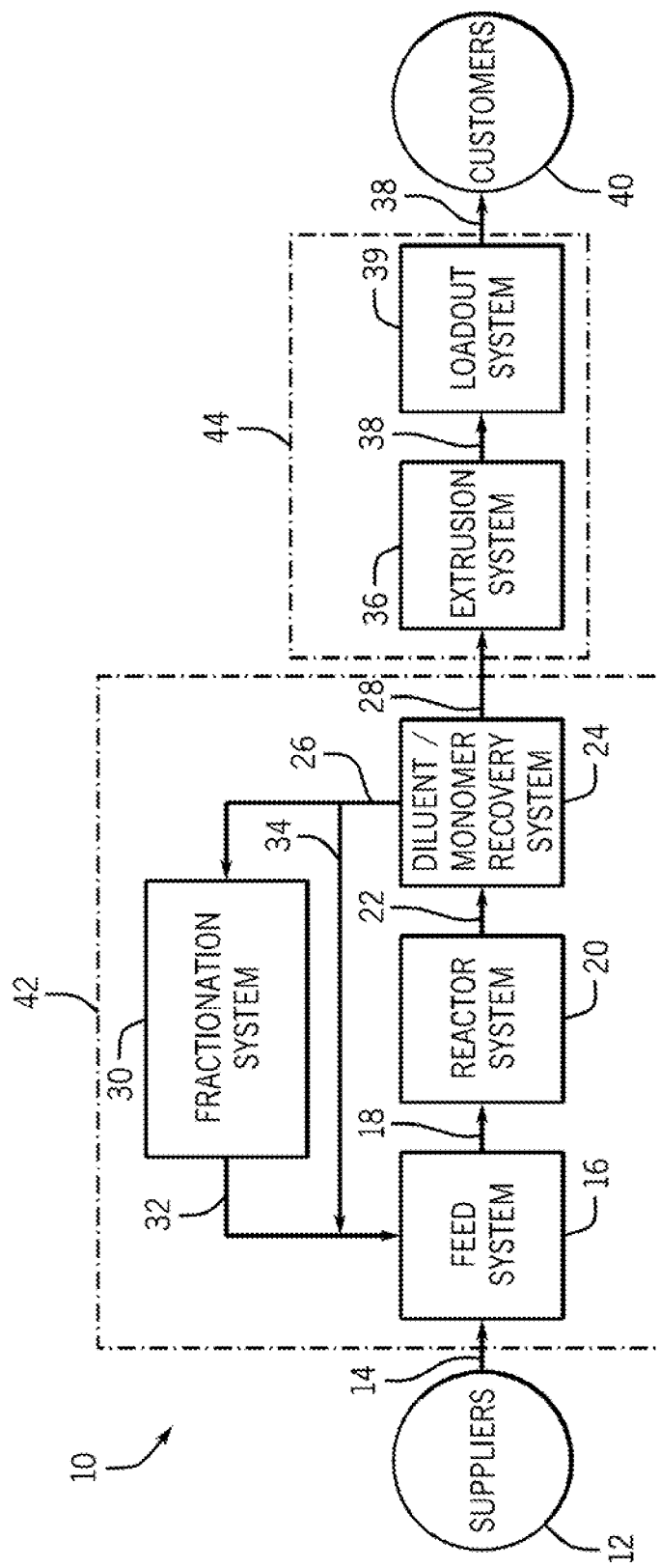
FIG. 1 is a block flow diagram depicting an exemplary polyolefin production system for producing polyolefin in accordance with embodiments of the present techniques.

One or more specific embodiments of the present invention will be described below. To provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill in the art and having the benefit of this disclosure.

The present techniques accommodate the production of different polyolefins in respective polymerization reactors in series. The polyolefin produced in the reactors may be different with respect to polymer density, molecular weight, or both, for example. To improve such production, the present techniques may employ different diluents (diluent compositions) in the respective series reactors. For instance, a heavy diluent may be used in the first reactor and a light diluent used in the second reactor, or vice versa. On the other hand a first light diluent may be employed in the first reactor and a second light diluent employed in the second reactor. Likewise, a first heavy diluent may be employed in the first reactor and a second heavy diluent employed in the second reactor. A separation system may be disposed between the series reactors to remove diluent from the transfer slurry to facilitate the use of different diluents in the respective reactors. Example separation systems are discussed below in Section III.

To achieve desired polymer characteristics in polyolefin production, more than one polymerization reactor may be employed, with each reactor having its own set of conditions. The reactors (e.g., loop reactors) may be connected in series, such that the polymer fluff slurry from one reactor may be transferred to a subsequent reactor, and so forth, until a polyolefin polymer is produced discharging from the final or terminal reactor with the desired set of characteristics. The respective reactor conditions including the polymerization recipe can be set and maintained such that the polyolefin (e.g., polyethylene, polypropylene) polymerized in each respective reactor may have a different molecular weight, different density, and so on. In the case of two reactors in series, two polyolefin polymers (e.g., one polymerized in the first reactor and the other polymerized in the second reactor), each having a different molecular weight fraction or different density, for instance, may be combined into one polymer product discharging from the second (final) reactor.

Thus, in polyolefin production with polymerization reactors in series, the reactors can be operated to produce different polyolefin polymers in each reactor. For example, the olefin monomer may be polymerized in the first reactor to produce a high molecular-weight polyolefin and having a low or high polymer density, and the olefin monomer polymerized in the second reactor to produce a low molecular-weight polyolefin and having a low or high polymer density. On the other hand, the olefin monomer may be polymerized in the first reactor to produce a low molecular-weight polyolefin and having a low or high polymer density, and the olefin monomer polymerized in the second reactor to produce a high molecular-weight polyolefin and having a low or high polymer density. Further, similar molecular weight polyolefin may be produced in each reactor but with the polyolefin density or other properties being different in each reactor.

Embodiments of the present techniques provide for the use of differing diluents in respective polymerization reactors (in a multi-reactor system) in the production of polyolefin. For example, for two polymerization reactors in series, a first diluent may be used in the first reactor, a second diluent used in the second reactor, and with the first diluent different than the second diluent. The present techniques recognize that different diluents may give respective advantages, depending on properties of the diluent, the type or grade of polyolefin being produced in a given reactor, operating conditions and state of the reactor system, desired polymer characteristics, and so on. Further, mixtures of diluents may be used in a given reactor. Also, the first diluent may be characterized as a first diluent composition, and the second diluent characterized as a second diluent composition.

In general, the lighter diluent (e.g. having lower molecular weight, lower boiling point, lower density, etc.) may provide better separation in a downstream flash separation system to recover separate the diluent from the polymer fluff, for example. The heavier diluent (e.g. having higher molecular weight, higher boiling point, greater density, etc.) may provide advantages. Further, diluents may generally facilitate heat transfer in the reactor via the diluent heat transfer properties. The heat transfer capability of the diluents may be characterized based on their heat capacity and thus respective capability to hold heat. In all, certain diluents are better than other diluents for reactor heat transfer considerations.

In terms of solubility, the diluents that are a "worse solvent," i.e., having a lower solubility of the polyolefin, provide for less polyolefin going into solution in the reactor. This can be beneficial to reduce reactor fouling. On the other hand, it may be desirable to have a "better solvent" so to dissolve polyolefin oligomers (very low molecular weight) to provide for improved properties of the polyolefin polymer, for example. As discussed below, the closer in value the solubility parameter (e.g., Hildebrand solubility parameter) of the hydrocarbon diluent to the polymer the more likely the polymer will dissolve. In other words, the closer in value the solubility parameter of the diluent versus the polyolefin, the better or stronger the diluent as a solvent of the polyolefin. As discussed below, solvent power of the diluent with respect to the polyolefin may be based on or correlated to the solubility parameter difference between the diluent and the polyolefin.

The Hildebrand solubility parameter for polyolefins such as polyethylene and polypropylene may generally fall in the range of about 15 $MPa^{1/2}$ to about 18 $MPa^{1/2}$, depending on the grade of polyolefin, experimental or measurement techniques for determining the Hildebrand solubility parameter, calculation assumptions, and so forth. For comparison to diluents, an exemplary value of 16.5 $MPa^{1/2}$ may be taken for polyethylene and polypropylene. Table 1 below gives the Hildebrand solubility parameter values for some diluents. The closer the solubility parameter values for the listed components, the more soluble the components with respect to each other. Thus, of the diluents listed, polyethylene and polypropylene (e.g., at 16.5 $MPa^{1/2}$) are most soluble in cyclohexane and cyclopentane, and the least soluble in propane and neopentane. Generally, the heavier the diluent, the greater the solubility of polyolefin in the diluent. However, as can be seen from Table 1, such a relationship can be mitigated somewhat by molecular structure of the diluent, where the polyolefin may be more soluble in a lighter diluent than in a heavier diluent. Moreover, the Hansen solubility parameter and other solubility parameters may be considered.

TABLE 1

| Hildebrand Solubility Parameters* | |
|---|---|
| | $(MPa)^{1/2}$ |
| propane | 12.7 |
| neopentane | 12.5 |
| isobutane | 12.8 |
| n-butane | 13.5 |
| isopentane | 13.8 |
| iso-octane | 14.0 |
| n-pentane | 14.3 |
| n-hexane | 14.8 |
| n-heptane | 15.1 |
| n-octane | 15.6 |
| cyclohexane | 16.7 |
| cyclopentane | 16.6 |

*CRC Solubility Handbook; Polymer Handbook, 3rd Ed. (Brandrup and Immergut, 1989).

A diluent with less solvent capability and thus having less solubility of polyolefin may advantageously be used with low molecular polyolefin grades (or lower MW components of the MWD) so that less polyolefin is dissolved in the diluent and thus reactor fouling is reduced. On the other hand, a diluent with higher solvent capability and thus having greater solubility of polyolefin may beneficially be employed with such low molecular-weight polyolefin (or lower MW components of the MWD) when desired to dissolve very low molecular weight polyolefin (e.g., oligomers or polymer at the very low end of the low molecular weight range) to improve polymer characteristics. Further, while high molecular-weight polyolefin is less soluble in diluent generally, these considerations may be relevant for high molecular-weight polyolefin. Indeed, diluents with less solvent capability may also be used in the reactor polymerizing high molecular-weight polyolefin to reduce lower MW components of the MWD of the high molecular-weight polyolefin from going into solution and which may contribute fouling of the reactor wall. Further, a diluent with higher solvent capability and thus having greater solubility of polyolefin may be employed with high molecular-weight polyolefin when desired to dissolve some of the polyolefin (e.g., lower MW components of the MWD, polymer at the low end of the molecular weight range) to improve polyolefin polymer characteristics.

Moreover, generally, the greater the density of the diluent the heavier the diluent, and the lower the density of the diluent the lighter the diluent. Further, generally and with exceptions such as that related to molecular structure, the heavier diluents have greater solubility (see Table 1) of polyolefin, and the lighter diluents have less solubility (see Table 1) of polyolefin.

Moreover, as indicated, a lighter diluent (e.g., lower density, lower boiling point, less heat of vaporization, etc.) may be beneficially employed in the terminal reactor discharging to the flash line such that the diluent more readily flashes (vaporizes) in the flash line. On the other hand, a lighter or heavier diluent (e.g., higher density, higher boiling point, etc.) and which tends to have higher thermal capacity (heat capacity) may be beneficially employed in a reactor in which the polyolefin polymerization has demanding heat removal requirements or conditions.

Table 2 below gives molecular weight (i.e., molecular mass) and boiling point data for some exemplary diluents. Table 2 also gives density and heat capacity at 650 psig and 220° F. for these diluents. The actual reactor operating temperature may depend on the solvent power of the diluent, for instance. In other words, the maximum operating temperature of the reactor may be less for a diluent having more solvent power with respect to the polyolefin. For example, for isobutane as the diluent in polyethylene production, the maximum reactor operating temperature may be 232° F., whereas for cyclohexane as the diluent in polyethylene production, the maximum reactor operating temperature may be 219° F.

TABLE 2

Exemplary Diluent Data

| Diluent | Molecular Mass (g/mol) | Boiling Point* (° C.) | Density** (lb/ft3) | Heat Capacity** (Btu/lb-° F.) |
| --- | --- | --- | --- | --- |
| propane | 44.10 | −42 | 14.6 | 1.22 |
| isobutane | 58.12 | −12 | 26.3 | 0.77 |
| n-butane | 58.12 | −1 | 28.5 | 0.74 |
| neopentane | 72.15 | 10 | 29.7 | 0.68 |
| isopentane | 72.15 | 28 | 32.6 | 0.65 |
| n-pentane | 72.15 | 36 | 33.1 | 0.65 |
| cyclopentane | 72.15 | 49 | 41.4 | 0.52 |
| n-hexane | 84.16 | 69 | 36.0 | 0.62 |
| cyclohexane | 84.16 | 81 | 43.5 | 0.51 |
| n-heptane | 100.21 | 98 | 38.0 | 0.60 |
| iso-octane | 114.23 | 98 | 38.7 | 0.59 |
| n-octane | 114.23 | 125 | 39.5 | 0.59 |

*At standard pressure of 1 atmosphere (atm)
**At 650 psig and 220° F.

It should be noted with reference to the above Table 2, propane is supercritical at certain operating conditions (e.g., 650 psig, 220° F.) of the polymerization reactor (e.g., loop reactor). While employment of supercritical propane as a diluent in the loop reactor is applicable, and the supercritical propane density is relatively stable as a function of temperature indicating low compressibility and liquid-like flow behavior, the heat capacity for supercritical propane may be more sensitive to temperature than for other diluents. For example, the heat capacity for supercritical propane in Btu/lb-° F. is 4.53 at 215° F., 1.22 at 220° F., 0.85 at 225° F., and 0.69 at 230° F. As a comparison in stability contrast, the heat capacity for isobutane in Btu/lb-° F. is 0.76 at 215° F., 0.77 at 220° F., 0.79 at 225° F., and 0.81 at 230° F.

Nevertheless, the present techniques accommodate employment of different diluents in different polymerization reactors disposed in series or parallel. For instance, as mentioned with two reactors in series, a first diluent may be employed in the first reactor and a second diluent employed in the second reactor. The operator, engineer, or product specialist may choose the specific diluent to employ in each reactor based on the polyolefin product recipe, the advantages or disadvantages offered by particular diluents relative to the product grade and plant operations, the state or status of the polymerization plant, and other desires or needs of production including economics and polyolefin product quality. Diluent properties that may be considered include molecular mass, boiling point, density, solubility parameter (e.g., Hildebrand), heat capacity, and so forth.

In certain examples, the diluents propane, isobutane, and n-butane may be characterized as light diluents (e.g., having a boiling point of less than about 0° C. and having lower molecular mass). In these examples, the diluents n-pentane, n-hexane, n-heptane, and n-octane may be characterized as heavy diluents (e.g., having a boiling point of greater than about 0° C. and having a higher molecular mass). Of course, such categories may be arbitrary and subject to application of the user. For instance, a dividing line may instead be drawn at 50° C., with diluents having boiling points greater than about 50° C. characterized as heavy diluents, and diluents having boiling points less than about 50° C. characterized as light diluents. On the other hand, a characterization of light versus heavy diluents may instead be based solely on molecular mass or diluent density, and the like. Further, a characterization of light versus heavy diluents may be inapplicable generally, and characterization may instead focus on solubility or heat capacity, for instance, or a combination of factors. In the case of heat capacity, where heat transfer considerations are a driving factor with a particular grade of polyolefin, for instance, then a diluent such as isobutane having a higher heat capacity may be desired. In all, the production or design engineer will choose to categorize diluents if so desired, or will instead select diluents without forming categories of diluents. Various properties of the diluents may be taken into consideration in the selection of which diluent or diluent mixture to employ in respective polymerization reactors. Again, diluent properties to consider may include molecular formula, molecular weight or mass, density, solubility parameter, boiling point, thermal capacity, vapor pressure, heat of vaporization, and so on.

In a certain examples with two polymerization reactors (e.g., loop reactors) in series, a low molecular-weight high-density polyethylene (LMW HDPE) is produced in one reactor and a high molecular-weight linear low-density polyethylene (HMW LLDPE) produced in the other reactor. Thus, the combined final product is a bimodal polyethylene discharging from the final (second reactor). A chain transfer agent (e.g., hydrogen) is fed to the reactor polymerizing the LMW HDPE to terminate polymer chain growth in the addition polymerization to facilitate production of the LMW HDPE in that reactor. In these examples, it may be advantageous to use differing diluents in the respective reactors for the foregoing reasons discussed and other reasons.

In one example, a diluent (e.g., propane) with lower solvent capability is employed in the reactor that produces the HMW LLDPE. This might facilitate production of a lower density polymer product (and with better properties) because the diluent has less solvent power. Thus, in the instance with the HMW LLDPE polymerized in the first reactor and the LMW HDPE polymerized in the second reactor, propane may be employed as the diluent in the first reactor, for example, and heptane or hexane employed in the second reactor, for example. Again, a mixture of diluents may also be employed in one or both of the reactors.

In another instance, a diluent having less solvent capability may be employed in the reactor that produces the LMW HDPE. This may facilitate less low molecular weight polymer to go into solution and less fouling. For example, for the process with HMW LLDPE polymerized in the first reactor and the LMW HDPE polymerized in the second reactor, heptane or hexane may be employed in the first reactor and propane employed in the second reactor. This would allow better heat transfer in the first reactor and less fouling in the second reactor. A mixture of diluents may also be employed in one or both of the reactors. In particular examples, a pure diluent is used in the first reactor, a hydrocyclone (or wash column) between the reactors concentrates the slurry and the diluent recycled back to the first reactor, and a different diluent (could be a diluent mixture) is used in the second reactor.

The present techniques may generally provide for removing diluent from polyolefin fluff slurry transferred between polymerization reactors in series to facilitate employment of different diluents in the respective reactors. To avoid or reduce carryover of the first diluent from the first reactor to the second reactor, a separation system disposed between the reactors removes the first diluent from the polyolefin slurry transferred from the first reactor to the second reactor. The transfer fluff slurry discharging from the first reactor to the second reactor is generally primarily polyolefin fluff solids and the first diluent. In some embodiments, the separation system may remove first diluent from the transfer slurry and forward a remaining stream concentrated in polyolefin fluff solids to the second reactor. The removed first diluent may be recycled to the first reactor. In certain examples, second diluent may be fed to the concentrated fluff solids stream discharging from the separation system. Second diluent may also be fed directly to the second reactor.

Thus, to remove diluent from a fluff transfer slurry discharging from a first reactor to a second reactor, for example, a separation system may be disposed between the two reactors. The separation system may be characterized as a diluent removal system. As discussed below, the separation system may employ a hydrocyclone, a wash column, a decanter, other unit operations, and so forth. Again, various embodiments of the separation system are discussed below in Section III.

Lastly, while the present discussion may focus on two reactors in series, the present techniques may be applicable to more than two reactors in series. Further, various combinations of molecular weights and comonomer additions in monomodal, bimodal, or multimodal polyolefin (e.g., polyethylene, polypropylene, etc.) may be applicable. Additionally, while the density of diluents may be compared, this density should not be confused with the bulk density of the circulating slurry in the reactor or with density (polymer property, e.g., annealed density) of the polyolefin. Furthermore, such differing diluent techniques disclosed herein may be applicable to lower-pressure polyolefin processes, such as those with reactors operating in a typical range of 50 psig to 100 psig, and with hexane as a common diluent, for example.

I. Polyolefin Production Overview

Turning now to the drawings, and referring initially to FIG. 1, a block diagram depicts an exemplary production system 10 for producing polyolefin such as polyethylene, polypropylene, and their copolymers, etc. The exemplary production system 10 is typically a continuous operation but may include both continuous and batch systems. An exemplary nominal capacity for the exemplary production system 10 is about 600-1600 million pounds of polyolefin produced per year. Exemplary hourly design rates are approximately 65,000 to 200,000 pounds of polymerized/extruded polyolefin per hour. It should be emphasized, however, that the present techniques apply to polyolefin manufacturing processes including polyethylene production systems having nominal capacities and design rates outside of these exemplary ranges.

Various suppliers 12 may provide reactor feedstocks 14 to the production system 10 via pipelines, ships, trucks, cylinders, drums, and so forth. The suppliers 12 may include off-site and/or on-site facilities, including olefin plants, refineries, catalyst plants, and the like. Examples of possible feedstocks include olefin monomers and comonomers (such as ethylene, propylene, butene, hexene, octene, and decene), diluents (such as propane, isobutane, n-butane, n-hexane, and n-heptane), chain transfer agents (such as hydrogen), catalysts (such as Ziegler-Natta catalysts, chromium catalysts, and metallocene catalysts) which may be heterogeneous, homogenous, supported, unsupported, and co-catalysts such as, triethylboron, organoaluminum compounds, methyl aluminoxane (MAO), triethylaluminum (TEAl), borates, TiBAL, etc., and activators such as solid super acids, and other additives. In the case of ethylene monomer, exemplary ethylene feedstock may be supplied via pipeline at approximately 800-1450 pounds per square inch gauge (psig) at 45-65° F. Exemplary hydrogen feedstock may also be supplied via pipeline, but at approximately 900-1000 psig at 90-110° F. Of course, a variety of supply conditions may exist for ethylene, hydrogen, and other feedstocks 14.

The suppliers 12 typically provide feedstocks 14 to a reactor feed system 16, where the feedstocks 14 may be stored, such as in monomer storage and feed tanks, diluent vessels, catalyst tanks, co-catalyst cylinders and tanks, and so forth. In the case of ethylene monomer feed, the ethylene may be fed to the polymerization reactors without intermediate storage in the feed system 16 in certain embodiments. In the feed system 16, the feedstocks 14 may be treated or processed prior to their introduction as feed 18 into the polymerization reactor system 20. For example, feedstocks 14, such as monomer, comonomer, and diluent, may be sent through treatment beds (e.g., molecular sieve beds, aluminum packing, etc.) to remove catalyst poisons. Such catalyst poisons may include, for example, water, oxygen, carbon monoxide, carbon dioxide, and organic compounds containing sulfur, oxygen, or halogens. The olefin monomer and comonomers may be liquid, gaseous, or a supercritical fluid, depending on the type of reactor being fed. Also, it should be noted that typically only a relatively small amount of fresh make-up diluent as feedstock 14 is utilized, with a majority of the diluent fed to the polymerization reactor recovered from the reactor effluent.

The feed system 16 may prepare or condition other feedstocks 14, such as catalysts, for addition to the polymerization reactors. For example, a catalyst may be prepared and then mixed with diluent (e.g., isobutane or hexane) or mineral oil in catalyst preparation tanks. Further, the feed system 16 typically provides for metering and controlling the addition rate of the feedstocks 14 into the polymerization reactor to maintain the desired reactor stability and/or to achieve the desired polyolefin properties or production rate. Furthermore, in operation, the feed system 16 may also store, treat, and meter recovered reactor effluent for recycle to the reactor. Indeed, operations in the feed system 16 generally receive both feedstock 14 and recovered reactor effluent streams.

In total, the feedstocks 14 and recovered reactor effluent are processed in the feed system 16 and fed as feed streams 18 (e.g., streams of monomer, comonomer, diluent, catalysts, co-catalysts, hydrogen, additives, or combinations thereof) to the reactor system 20. As discussed below, the streams 18 may be delivered in feed conduits to the reactor which tap into the wall of the polymerization reactor in the reactor system 20. Moreover, a given feed system 16 may be dedicated to a particular reactor or to multiple reactors disposed/operated in series or parallel. Further, a feed system 16 may receive recycle components (e.g., diluent) from one or more downstream processing systems.

The reactor system 20 may have one or more reactor vessels, such as liquid-phase or gas-phase reactors. If multiple reactors are employed, the reactors may be arranged in series, in parallel, or in other combinations or configurations. As discussed below, multiple reactors arranged and operated in series may be shifted in operation to a parallel or independent operation.

In the polymerization reactor vessels, one or more olefin monomers and optionally comonomers are polymerized to form a product polymer particulates, typically called fluff or granules. In one example, the monomer is ethylene and the comonomer is 1-hexene. In another example, the monomer is propylene and the comonomer is ethylene. The fluff may possess one or more melt, physical, rheological, and/or mechanical properties of interest, such as density, melt index (MI), molecular weight, copolymer or comonomer content, modulus, and the like. The reaction conditions, such as temperature, pressure, flow rate, mechanical agitation, product takeoff, component concentrations, catalyst type, polymer production rate, and so forth, may be selected to achieve the desired fluff properties.

In addition to the one or more olefin monomers and comonomers, a catalyst that facilitates polymerization of the ethylene monomer is typically added to the reactor. The catalyst may be a particle suspended in the fluid medium within the reactor. In general, Ziegler catalysts, Ziegler-Natta catalysts, metallocene catalysts, chromium catalysts, nickel catalysts, post-metallocene and other well-known polyolefin catalysts, as well as co-catalysts, may be used. Typically, an olefin-free diluent or mineral oil, for example, is used in the preparation and/or delivery of the catalyst in a feed conduit that taps into the wall of the polymerization reactor. Further, diluent may be fed into the reactor, typically a liquid-phase reactor.

The diluent may be an inert hydrocarbon that is liquid at reaction conditions, such as isobutane, propane, n-butane, n-pentane, i-pentane, neopentane, n-hexane, n-heptane, cyclohexane, cyclopentane, methylcyclopentane, ethylcyclohexane, and the like. The purpose of the diluent is generally to suspend the catalyst particles and polymer within the reactor. Diluent, as indicated, may also be used for reactor or line flushes to mitigate plugging or fouling, to facilitate flow of the polymer slurry in lines, and so on. Moreover, in examples of polypropylene production, the propylene monomer itself may act as a diluent.

A motive device may be present within each of the one or more reactors in the reactor system 20. For example, within a liquid-phase reactor, such as a loop slurry reactor, an impeller may create a mixing zone within the fluid medium. The impeller may be driven by a motor to propel the fluid medium as well as any catalyst, polyolefin fluff, or other solid particulates suspended within the fluid medium, through the closed loop of the reactor. Similarly, within a gas-phase reactor, such as a fluidized bed reactor or plug flow reactor, one or more paddles or stirrers may be used to mix the solid particles within the reactor.

The discharge of polyolefin fluff product slurry 22 of the reactors from system 20 may include the polymer polyolefin fluff as well as non-polymer components, such as diluent, unreacted monomer/comonomer, and residual catalyst. In construction of the reactors in certain embodiments, a discharge nozzle and conduit may be installed (e.g., welded) at a tap or hole cut into the reactor wall. The discharge of the fluff product slurry 22 exiting the reactor system (e.g., the final reactor in a series of reactors) through the discharge nozzle may be subsequently processed, such as by a diluent/monomer recovery system 24. The fluff product slurry 22 may also be called a reactor product discharge slurry, a reactor product discharge, or a reactor discharge, etc. Thus, depending on context, a "reactor discharge" may refer to the fluff slurry exiting the reactor and/or to the physical configuration (e.g., reactor wall tap or opening, nozzle, conduit, valve if any, etc.) discharging the fluff slurry.

Furthermore, it should be noted that the liquid (e.g., diluent) in fluff product slurry 22 generally partially or fully vaporizes through a flash line including a flash line heater (not shown) downstream of the reactor in route to the diluent/monomer recovery system 24. As discussed below, such vaporization may be due to decreasing pressure through the flash line, and/or due to heat added by the flash line heater (e.g., a conduit with a steam or steam condensate jacket). The diluent/monomer recovery system 24 may process the fluff product slurry 22 (whether the liquid in the slurry 22 is partially or fully vaporized in the flash line) from the reactor system 20 to separate non-polymer components 26 (e.g., diluent and unreacted monomer) from the polymer fluff 28.

A fractionation system 30 may process the untreated recovered non-polymer components 26 (e.g., diluent/monomer) to remove undesirable heavy and light components and to produce olefin-free diluent, for example. Fractionated product streams 32 may then return to the reactor system 20 either directly (not shown) or via the feed system 16. Such olefin-free diluent may be employed in catalyst preparation/delivery in the feed system 16 and as reactor or line flushes in the reactor system 20.

A portion or all of the non-polymer components 26 may bypass the fractionation system 30 and more directly recycle to the reactor system (not shown) or the feed system 16, as indicated by reference numeral 34. In certain embodiments, up to 80-95% of the diluent discharged from the reactor system 20 bypasses the fractionation system 30 in route to the polymerization feed system 16 (and ultimately the reactor system 20). Moreover, although not illustrated, polymer granules intermediate in the recovery system 24 and typically containing active residual catalyst may be returned to the reactor system 20 for further polymerization, such as in a different type of reactor or under different reaction conditions.

The polyolefin fluff 28 discharging from the diluent/monomer recovery system 24 may be extruded into polyolefin pellets 38 in an extrusion system 36. In the extrusion system 36, the fluff 28 is typically extruded to produce polymer pellets 38 with the desired mechanical, physical, and melt characteristics. An extruder/pelletizer receives the extruder feed including one or more fluff products 28 and whatever additives have been added. Extruder feed may include additives added to the fluff products 28 to impart desired characteristics to the extruded polymer pellets 38. The extruder/pelletizer heats and melts the extruder feed which then may be extruded (e.g., via a twin screw extruder) through a pelletizer die under pressure to form polyolefin pellets 38. Such pellets are typically cooled in a water system disposed at or near the discharge of the pelletizer.

A loadout system 39 may prepare the polyolefin pellets 38 for shipment in to customers 40. In general, the polyolefin pellets 38 may be transported from the extrusion system 36 to a product loadout area 39 where the pellets 38 may be stored, blended with other pellets, and/or loaded into railcars, trucks, bags, and so forth, for distribution to customers 40. Polyolefin pellets 38 shipped to customers 40 may include low density polyethylene (LDPE), linear low density polyethylene (LLDPE), medium density polyethylene (MDPE), high density polyethylene (HDPE), enhanced polyethylene, isotactic polypropylene (iPP), syndiotactic polypropylene (sPP), including various copolymers, and so on. The polymerization and diluent recovery portions of the polyolefin production system 10 may be called the "wet" end 42 or alternatively "reaction" side of the process 10. The extrusion 36 and loadout 39 systems of the polyolefin production system 10 may be called the "dry" end 44 or alternatively "finishing" side of the polyolefin process 10. Moreover, while the polyolefin pellets 38 discharging from the extrusion system 36 may be stored and blended in the loadout area 39, the polyolefin pellets 38 are generally not altered by the loadout system 39 prior to being sent to the customer 40.

Polyolefin pellets 38 may be used in the manufacturing of a variety of products, components, household items and other items, including adhesives (e.g., hot-melt adhesive applications), electrical wire and cable, agricultural films, shrink film, stretch film, food packaging films, flexible food packaging, milk containers, frozen-food packaging, trash and can liners, grocery bags, heavy-duty sacks, plastic bottles, safety equipment, carpeting, coatings, toys and an array of containers and plastic products. To form the end-products or components, the pellets 38 are generally subjected to processing, such as blow molding, injection molding, rotational molding, blown film, cast film, extrusion (e.g., sheet extrusion, pipe and corrugated extrusion, coating/lamination extrusion, etc.), and so on. Ultimately, the products and components formed from polyolefin pellets 38 may be further processed and assembled for distribution and sale to the consumer. For example, extruded pipe or film may be packaged for distribution to the customer, or a fuel tank comprising polyethylene may be assembled into an automobile for distribution and sale to the consumer, and so on.

Process variables in the polyolefin production system 10 may be controlled automatically and/or manually via valve configurations, control systems, and so on. In general, a control system, such as a processor-based system, may facilitate management of a range of operations in the polyolefin production system 10, such as those represented in FIG. 1. Polyolefin manufacturing facilities may include a central control room or location, as well as a central control system, such as a distributed control system (DCS) and/or programmable logic controller (PLC). The reactor system 20 typically employs a processor-based system, such as a DCS, and may also employ advanced process control known in the art. The feed system 16, diluent/monomer recovery 24, and fractionation system 30 may also be controlled by the DCS. In the dry end of the plant, the extruder and/or pellet loading operations may also be controlled via a processor-based system (e.g., DCS or PLC). Moreover, in the controls systems, computer-readable media may store control executable code to be executed by associated processors including central processing units, and the like. Such code executable by the processor may include logic to facilitate the operations described herein.

The DCS and associated control system(s) in the polyolefin production system 10 may include the appropriate hardware, software logic and code, to interface with the various process equipment, control valves, conduits, instrumentation, etc., to facilitate measurement and control of process variables, to implement control schemes, to perform calculations, and so on. A variety of instrumentation known to those of ordinary skill in the art may be provided to measure process variables, such as pressure, temperature, flow rate, and so on, and to transmit a signal to the control system, where the measured data may be read by an operator and/or used as an input in various control functions. Depending on the application and other factors, indication of the process variables may be read locally or remotely by an operator, and used for a variety of control purposes via the control system.

A polyolefin manufacturing facility typically has a control room from which the plant manager, engineer, technician, supervisor and/or operator, and so on, monitors and controls the process. When using a DCS, the control room may be the center of activity, facilitating the effective monitoring and control of the process or facility. The control room and DCS may contain a Human Machine Interface (HMI), which is a computer, for example, that runs specialized software to provide a user-interface for the control system. The HMI may vary by vendor and present the user with a graphical version of the remote process. There may be multiple HMI consoles or workstations, with varying degrees of access to data.

II. Polymerization Reactor System

As discussed above, the reactor system 20 may include one or more polymerization reactors, which may in turn be of the same or different types. Furthermore, with multiple reactors, the reactors may be arranged serially or in parallel. Whatever the reactor types in the reactor system 20, a polyolefin particulate product, generically referred to as "fluff" herein, is produced. To facilitate explanation, the following examples are limited in scope to specific reactor types believed to be familiar to those skilled in the art and to combinations. To one of ordinary skill in the art using this disclosure, however, the present techniques are applicable to more complex reactor arrangements, such as those involving additional reactors, different reactor types, and/or alternative ordering of the reactors or reactor types, as well as various diluent and monomer recovery systems and equipment disposed between or among the reactors, and so on. Such arrangements are considered to be well within the scope of the present invention.

One reactor type include reactors within which polymerization occurs within a liquid phase. Examples of such liquid phase reactors include autoclaves, boiling liquid-pool reactors, loop slurry reactors (vertical or horizontal), and so forth. For simplicity, a loop slurry reactor which produces polyolefin, such as polyethylene or polypropylene, is discussed in the present context though it is to be understood that the present techniques may be similarly applicable to other types of liquid phase reactors.

Figure 2:
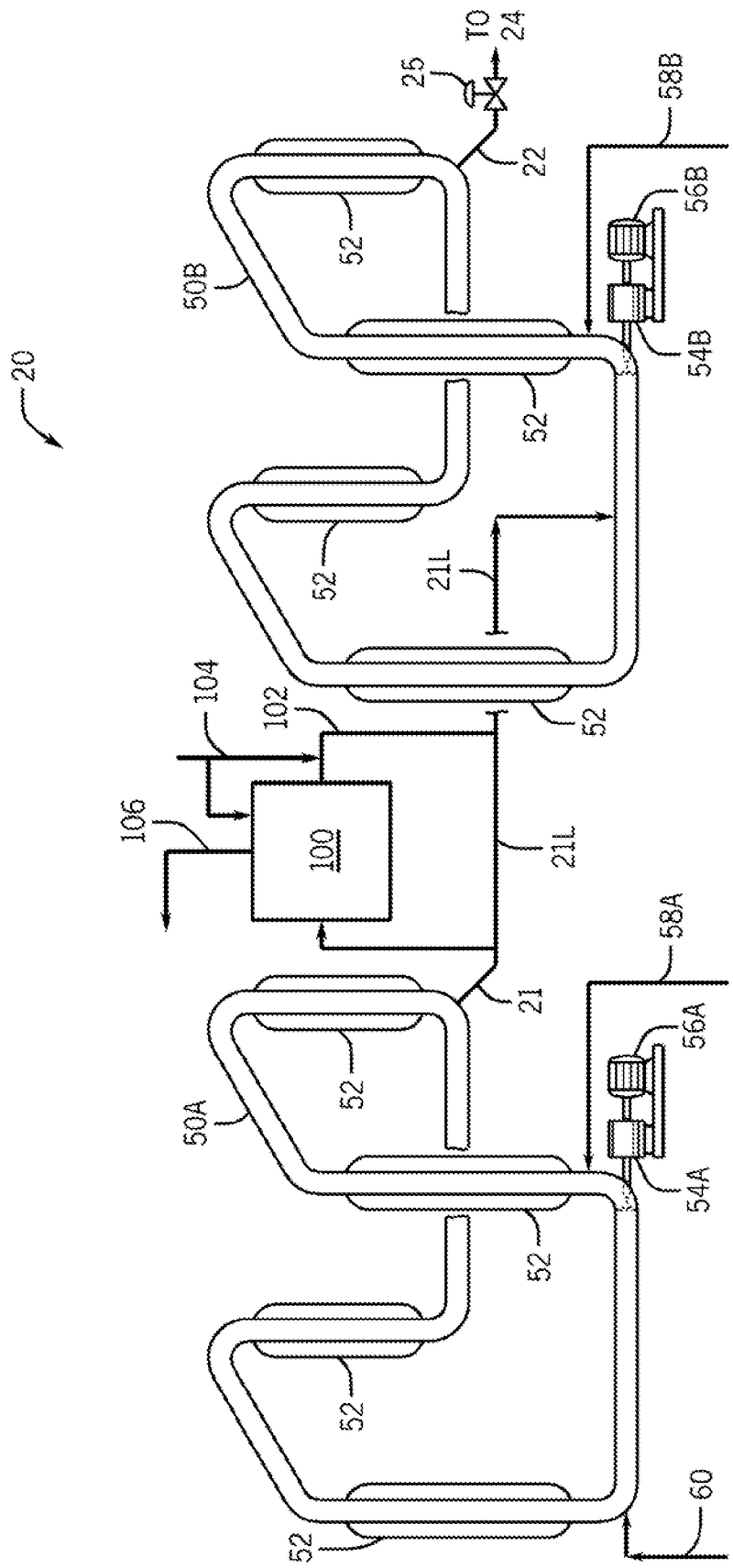
FIG. 2 is a process flow diagram of an exemplary reactor system of the polyolefin production system of FIG. 1 in accordance with embodiments of the present techniques.

FIG. 2 depicts an exemplary polymerization reactor system 20 (of FIG. 1) as having two loop slurry (polymerization) reactors 50A, 50B disposed and operated in series. Additional loop reactors or other reactors (e.g., gas phase reactors) may be disposed in series or parallel in the illustrated combination. Moreover, in embodiments, the reactors 50A, 50B may be shifted to a parallel operation, and/or processing equipment may be disposed between the two loop reactors 50A, 50B as depicted, for example, and so on. Indeed, the present techniques contemplate aspects of a variety of reactor system configurations such as those also disclosed in U.S. Patent Application Publication No. 2011/0288247 which is incorporated by reference herein in its entirety.

A loop slurry reactor 50A, 50B is generally composed of segments of pipe connected by smooth bends or elbows. The representation of the loop reactors 50A, 50B in FIG. 2 is simplified, as appreciated by the skilled artisan. Indeed, an exemplary reactor 50A, 50B configuration may include eight to sixteen or other number of jacketed vertical pipe legs, approximately 24 inches in diameter and approximately 200 feet in length, connected by pipe elbows at the top and bottom of the legs. FIG. 2 shows a four leg segment reactor arranged vertically. It could also be arranged horizontally. The reactor jackets 52 are normally provided to remove heat from the exothermic polymerization via circulation of a cooling medium, such as treated water, through the reactor jackets 52.

The reactors 50A, 50B may be used to carry out polyolefin (e.g., polyethylene, polypropylene) polymerization under slurry conditions in which insoluble particles of polyolefin are formed in a fluid medium and are suspended as slurry until removed. A respective motive device, such as pump 54A, 54B, circulates the fluid slurry in each reactor 50A, 50B. An example of a pump 54A, 54B is an in-line axial flow pump with the pump impeller disposed within the interior of the reactor 50A, 50B to create a turbulent mixing zone within the fluid medium. The impeller may also assist in propelling the fluid medium through the closed loop of the reactor at sufficient speed to keep solid particulates, such as the catalyst or polyolefin product, suspended within the fluid medium. The impeller may be driven by a motor 56A, 56B or other motive force.

The fluid medium within each reactor 50A, 50B may include olefin monomers and comonomers, diluent, co-catalysts (e.g., alkyls, triethylboron, TiBAL, TEAl, methyl aluminoxane or MAO, borates, TEB, etc.), activator supports like solid super acids, molecular weight control agents (e.g., hydrogen), and any other desired co-reactants or additives. Such olefin monomers and comonomers are generally 1-olefins having up to 10 carbon atoms per molecule and typically no branching nearer the double bond than the 4-position. Examples of monomers and comonomers include ethylene, propylene, butene, 1-pentene, 1-hexene, 1-octene, and 1-decene. Again, typical diluents are hydrocarbons which are inert and liquid under reaction conditions, and include, for example, isobutane, propane, n-butane, n-pentane, i-pentane, neopentane, n-hexane, n-heptane, cyclohexane, cyclopentane, methylcyclopentane, ethylcyclohexane, and the like. These components are added to the reactor interior via inlets or conduits at specified locations, such as depicted at feed streams 58A, 58B, which generally corresponds to one of the feed streams 18 of FIG. 1.

Likewise, a catalyst, such as those previously discussed, may be added to the reactor 50A via a conduit at a suitable location, such as depicted at feed stream 60, which may include a diluent carrier and which also generally corresponds to one of the feed streams 18 of FIG. 1. Again, the conduits that feed the various components tie-in (i.e., flange or weld) to the reactor 50. In the illustrated embodiment, catalyst feed 60 is added to the first reactor 50A in series but not to the second reactor 50B. However, active catalyst may discharge in a fluff slurry 21 from the first reactor 50A to the second reactor 50B. Moreover, while not depicted, a fresh catalyst may be added to the second reactor 50B in certain embodiments. In total, the added components including the catalyst and other feed components generally compose a fluid medium within the reactor 50A, 50B in which the catalyst is a suspended particle.

The reaction conditions, such as temperature, pressure, and reactant concentrations, in each reactor 50A, 50B are regulated to facilitate the desired properties and production rate of the polyolefin in the reactor, to control stability of the reactor, and the like. Temperature is typically maintained below that level at which the polymer product would significantly go into solution, swell, soften, or become sticky. As indicated, due to the exothermic nature of the polymerization reaction, a cooling fluid may be circulated through jackets 52 around portions of the loop slurry reactor 50A, 50B to remove excess heat, thereby maintaining the temperature within the desired range, generally between 150° F. to 250° F. (65° C. to 121° C.). Likewise, pressure in each loop reactor 50A, 50B may be regulated within a desired pressure range, generally 100 to 800 psig, with a range of 450 to 700 psig being typical.

As the polymerization reaction proceeds within each reactor 50A, 50B, the monomer (e.g., ethylene) and comonomers (e.g., 1-hexene) polymerize to form polyolefin (e.g., polyethylene) polymers that are substantially insoluble in the fluid medium at the reaction temperature, thereby forming a slurry of solid particulates within the medium. These solid polyolefin particulates may be removed from each reactor 50A, 50B via a reactor discharge. In the illustrated embodiment of FIG. 2, a transfer slurry 21 is discharge from the first reactor 50B, and a product slurry 22 is discharged from the second reactor 50B.

For the transfer slurry 21 and product slurry 22, the reactor discharge may be (1) an intermittent discharge such as a settling leg, pulsating on/off valve, and so on, or (2) a continuous discharge such as continuous take-off (CTO) which has a modulating valve, and so forth. As for a continuous discharge of the transfer slurry 21 from the first reactor 50A, a continuous discharge on the first reactor may be a CTO, or may be a continuous discharge without a modulating valve (but with an isolation valve, for example), and so on. The pressure differential between the discharge of the first loop reactor pump 54A and the suction of the second loop reactor pump 54B may provide a motive force for the transfer of transfer slurry 21 from the first loop reactor 50A to the second loop reactor 50B.). Note that pump suction, whether of the first pump 54A or second pump 54B, may be considered upstream of the pump in pipe length of the respective loop in the range of about 0.5 meter to 50 meters (e.g., 0.5, 1, 5, 15, 25, 50 meters, or values in between).

As mentioned, FIG. 2 depicts two loop reactors 50A, 50B in series. The two loop reactors 50A, 50B may be operated such that the polyolefin fluff in the fluff slurry 22 discharging from the second reactor 50B is monomodal or bimodal. In certain cases of monomodal production, the reactor operating conditions may be set such that essentially the same polyolefin or similar polyolefin is polymerized in each reactor 50A, 50B. On the other hand, in monomodal production in terms of molecular weight, the conditions in the reactor may be the same or similar such as with regard to hydrogen concentration but different in terms of comonomer concentration, for example, so to produce polyolefin with similar molecular weight but different polymer density in each reactor.

In the case of bimodal production, the reactor operating conditions may be set such that the polyolefin polymerized in the first reactor 50A is different than the polyolefin polymerized in the second reactor 50B. Thus, with two reactors, a first polyolefin produced in the first loop reactor 50A and the second polyolefin produced in the second loop reactor 50B may combine to give a bimodal polyolefin or a monomodal polyolefin. Further, again, whether monomodal or bimodal, i.e. in terms of molecular weight, the first polyolefin produced in the first loop reactor 50A and the second polyolefin produced in the second loop reactor 50A may have different polymer densities, for example.

Operation of the two loop reactors 50A, 50B may include feeding more comonomer to the first polymerization reactor than to the second polymerization rector, or vice versa. The operation may also include feeding more chain transfer agent (e.g., hydrogen) to the second polymerization reactor than the second reactor, or vice versa. Of course, the same amount of comonomer and/or the same amount of chain transfer agent (e.g., hydrogen) may be fed to each reactor 50A, 50B. Further, the same or different comonomer concentration may be maintained in each reactor 50. Likewise, the same or different chain transfer agent (e.g., hydrogen) concentration may be maintained in each reactor 50A, 50B.

Furthermore, the first polyolefin (i.e., polyolefin polymerized in the first reactor 50A) may have a first range for a physical property, and the second polyolefin (i.e., polyolefin polymerized in the second reactor 50B) may have a second range for the physical property. The first range and the second range may be the same or different. Exemplary physical properties may include polyolefin density, comonomer percentage, short chain branching amount, molecular weight, viscosity, melt index, melt flow rate, crystallinity, and the like.

As indicated, the polyolefin product fluff slurry 22 discharges from the second reactor 50B and is subjected to downstream processing, such as in a diluent/monomer recovery system 24. The product fluff slurry 22 may discharge through a settling leg, a continuous take-off (CTO), or other valve configurations. The product fluff slurry 22 may discharge intermittently such as through a settling leg configuration, or instead may discharge continuously such as through a CTO.

In operation, depending on the positioning of the discharge on the reactor, for example, a discharge slurry 22 having a greater solids concentration than the slurry circulating in the reactor 50B may be realized with a discharge configuration having an isolation valve (Ram valve) alone, or having a CTO configuration with an isolation valve (Ram valve) and modulating valve 25. A Ram valve in a closed position may beneficially provide a surface that is flush with the inner wall of the reactor to preclude the presence of a cavity, space, or void for polymer to collect when the Ram valve is in the closed position. Exemplary CTO configurations and control, and other discharge configurations, may be found in the aforementioned U.S. Patent Application Publication No. 2011/0288247, and in U.S. Pat. No. 6,239,235 which is also incorporated herein by reference in its entirety.

In the illustrated embodiment, the product fluff slurry 22 discharges through a CTO. In certain examples, a CTO has a Ram valve at the reactor 50B wall, and a modulating flow control valve 25 (e.g., v-ball control valve) on the discharge conduit. Again, however, in an alternate embodiment, the product fluff slurry 22 may discharge through a settling leg configuration, for example, in lieu of a CTO.

A transfer fluff slurry 21 discharges from the first loop reactor 50A to the second loop reactor 50B via a transfer line 21L. The contents of transfer fluff slurry 21 may be representative of the contents of the first loop reactor 50A. However, the solids concentration may be greater in the transfer slurry 21 than in the first loop reactor 50A, depending on the positioning of the inlet of the transfer line 21L on the first loop reactor 50A, for example, and other considerations. The transfer fluff slurry 21 may discharge from the first loop reactor 50A into the transfer line 21L through a settling leg, an isolation valve (e.g., a Ram valve), a continuous take-off (which as indicated the CTO has an isolation or Ram valve and a modulating valve), or other valve configuration.

As indicated, a variety of discharge configurations are contemplated for a continuous discharge. Employment of an isolation valve (e.g., full-bore Ram valve) without an accompanying modulating valve may provide for continuous discharge of slurry from the loop reactor. Further, a CTO is defined as a continuous discharge having at least a modulating flow valve, and provides for a continuous discharge of slurry from the loop reactor. In certain examples, a CTO is further defined as a continuous discharge having an isolation valve (e.g., Ram valve) at the reactor wall and a modulating valve (e.g., v-ball valve) on the discharge conduit at the reactor.

In the illustrated embodiment, the discharge of the transfer slurry 21 from the first loop reactor 50A is continuous and not directly modulated. A CTO or settling leg is not employed. Instead, the transfer slurry 21 discharges through an isolation valve or Ram valve (not shown) on the transfer line 21L at the reactor wall and without a modulating valve in this example. In a particular example, the transfer slurry 21 discharges through a full-bore Ram valve maintained in a full-open position, and not additionally through a modulating valve. In alternate embodiments (not illustrated) a modulating valve may be disposed downstream on the transfer line 21, or a CTO with its modulating valve may be situated at the transfer slurry 21 discharge of the first reactor 50A. If so included, the modulating valve may control flow rate of the transfer slurry 21 and facilitate control of pressure in the first loop reactor 50A. Moreover, a modulating valve or a CTO and its modulating valve may be disposed to facilitate control of the first reactor 50A discharge when the two reactors 50A and 50B are shifted in operation to parallel performance.

Nevertheless, in the various embodiments, an isolation (e.g., Ram) valve is typically disposed on the discharge at the wall of the first loop reactor 50A. The Ram valve may provide for isolation of the transfer line 21L from the loop reactor 50A when such isolation is desired. A Ram valve may also be positioned at the outlet of the transfer line 21L at the wall of the second loop reactor 50B to provide for isolation of the transfer line 21L from the second loop reactor 50B when such isolation is desired. It may be desired to isolate the transfer line 21L from the first and second loop reactors 50A, 50B during maintenance or downtime of the reactor system 20, or when an alternate discharge or transfer line from the first reactor 50A is placed in service, and so on. The operation or control of the Ram valves may be manual, hydraulic-assisted, air-assisted, remote, automated, and so on. The transfer line 21L may be manually removed from service (e.g., manually closing the Ram valves) or automatically removed (e.g., via a control system automatically closing the Ram valves) from service.

In the illustrated embodiment, control of pressure (and throughput) in the first loop reactor 50A and the second loop reactor 50B may be facilitated by operation of the CTO flow control valve 25. In some examples, the pressure in the first loop reactor 50A may float on the pressure in the second loop reactor 50B. The reactors 50A, 50B may be maintained at the same, similar, or different pressure. Pressure elements or instruments may be disposed on the reactors 50A, 50B and on the transfer line 21L. Further, other process variable elements or instruments indicating temperature, flow rate, slurry density, and so forth, may also be so disposed.

Such instrumentation may include a sensor or sensing element, a transmitter, and so forth. For a pressure element, the sensing element may include a diaphragm, for example. For a temperature element or instrument, the sensing element may include a thermocouple, a resistance temperature detector (RTD), and the like, of which may be housed in a thermowell, for instance. Transmitters may convert a received analog signal from the sensing element to a digital signal for feed or transmission to a control system, for example. The various instruments may have local indication of the sense variable. For instance, a pressure element or instrument may be or have a local pressure gauge and a temperature element or instrument may be or have a local temperature gauge, both of which may be read locally by an operator or engineer, for example.

The inlet position of the transfer line 21L may couple to the first loop reactor 50A on the discharge side of the circulation pump 56A in the first loop reactor 50A. The outlet position of the transfer line 21L may couple to the second loop reactor on the suction side of the circulation pump 56B in the second loop reactor 50B. Such a configuration may provide a positive pressure differential (i.e., a driving force) for flow of transfer slurry 21 through the transfer line 21L from the first loop reactor 50A to the second loop reactor 50B. In one example, a typical pressure differential (provided from the discharge of the first pump 54A to the suction of the second pump 54B) is about 20 pounds per square inch (psi). Again, that pump suction, whether of the first pump 54A or second pump 54B, may be considered upstream of the pump in linear loop pipe length in the range of about 0.5 meter to 50 meters (e.g., 0.5, 1, 5, 15, 25, 50 meters, or values therebetween).

III. Separation System

Removal of First Diluent

Continuing with FIG. 2, a separation system 100 may be disposed between the first reactor 50A and the second reactor 50B. The separation system 100 may be used to remove from the transfer slurry 21 the first diluent employed in the first reactor 50A. This may be beneficial in cases where the second reactor 50B employs a second diluent different than the first diluent.

In the illustrated embodiment, the transfer slurry 21 may be diverted from the transfer line 21L to the separation system 100 via a diverter or 3-way valve (not shown) disposed on the transfer line 21L, for example. The separation system 100 removes diluent (i.e., first diluent) from the transfer slurry 21 and discharges a processed fluff slurry 102 back into the transfer line 21L via another diverter or 3-way valve (not shown) disposed on the transfer line 21L in route to the second reactor 50B. On the other hand, the fluff slurry 102 may be sent to the second reactor 50B via a conduit (not shown) other than the downstream portion of the transfer line 21L. Moreover, in certain embodiments, the fluff slurry 102 discharging from the separation system 100 is concentrated in fluff solids. Optionally, second diluent 104 (i.e., second diluent) may be fed directly to the separation system 100 and/or introduced into the fluff slurry 102 in route to the second reactor 50A. Further, second diluent may be fed directly to the second reactor 50B (e.g., via feed stream 58B, as discussed above), and so on.

As indicated, the separation system 100 may remove first diluent from the transfer slurry 21, and discharge the first diluent and other removed components as a separated stream 106 (e.g., recycle stream). In certain examples, the separated stream 106 has at least 90 weight percent of first diluent. The separated stream 106 may be recycled directly to the first reactor 50A, or sent to a recovery system (not shown) prior to recycle of the removed components to the reactor system. In some examples, the separated stream 106 may include some carryover of fluff solids from transfer slurry 21.

Further, the fluff slurry 102 contains less content of first diluent (i.e., the diluent employed in the first reactor 50A) than in the transfer slurry 21. For example, the separation system 100 removes about 20 weight % to about 100 weight % of the first diluent in the transfer slurry 21 and discharges the removed first diluent in the separated stream 106. Thus, the fluff slurry 102 has a lower content of first diluent than in the transfer slurry 21. In some embodiments, the fluff slurry 102 has substantially no first diluent, i.e., about zero weight % or less than 0.1 weight %.

In certain embodiments, the separation system 100 includes a hydrocyclone. The transfer slurry 21 is fed to the hydrocyclone. A fluff slurry 102 discharges from a bottom portion of the hydrocyclone and is sent to the second loop reactor 50B. A separated stream 106 having the first diluent discharges from a top portion of the hydrocyclone and is recycled to the first loop reactor 50A.

The fluff slurry 102 discharging from the bottom portion of the hydrocyclone may be concentrated in fluff solids and significantly reduced amount of first diluent or substantially free of first diluent. Optionally, as indicated, second diluent 104 may be added to the fluff slurry 102. Further, as represented by feed stream 58B, second diluent may be added directly to the second reactor 50B.

The separated stream 106 discharging from the upper portion of the hydrocyclone generally includes first diluent and unreacted monomer (and unreacted comonomer and hydrogen when employed in the first reactor) from the transfer slurry 21L. The separated stream 106, in some examples, may also include carryover of a relatively small amount of fluff solids from the transfer slurry 21L. The separated stream 106 may be recycled to the first loop reactor 50A such as to a loop segment on the suction side of the loop circulation pump 54A, for example. In a broad sense, the suction side of the loop pump 54A or 54B may be considered half of the total linear length of the respective loop reactor. (And in a broad sense, the other half may be generally considered the discharge side of the loop pump 54A or 54B.) More particularly, as indication the suction side of the first pump 54A or second pump 54B may be considered upstream of the pump in linear loop pipe length in the range of about 0.5 meter to 50 meters (e.g., 0.5, 1, 5, 15, 25, 50 meters, or values therebetween).

In embodiments, the loop circulation pump 54A in the first loop reactor 50A may provide the motive force (i.e., pressure differential) to drive the transfer slurry 21L though the hydrocyclone, to drive the fluff slurry 102 to the second reactor 50B, and to drive the recycle of the separated stream 106 to the first reactor 50A. In alternate embodiments, a booster pump, for instance, may provide additional motive force for the recycled separated stream 106 to the first reactor 50A or recovery system, and/or for the concentrated fluff slurry 102 discharging from the hydrocyclone to the second reactor.

In certain embodiments, the flow rate of the separated stream 106 is not modulated with a control valve. For example, the separated stream 106 recycles to the first reactor 50A without flowing through a control valve. For instance, a control valve is not disposed on the conduit routing the separated stream 106 to the first reactor 50A. The present techniques may make feasible such unregulated flow of the separated stream 106 by beneficial placement of the hydrocyclone, and with strategic use of the pressure differential between the discharge point (i.e., of the transfer slurry 21) of the first reactor 50A versus the inlet point (i.e., of the fluff slurry 102) to the second reactor 50B, and so forth.

The separation system 100 may employ a decanter in lieu of or in addition to the hydrocyclone. For example, the transfer slurry 21 may be routed to the decanter. The fluff solids settle in the decanter and are withdrawn in a fluff slurry 102 from a bottom portion of the decanter. The fluff slurry 202 may be sent to the second reactor 50B via a downstream portion of the transfer line 21L, for example. In alternate embodiments, the fluff slurry 102 may be sent to the second reactor 50B via a conduit other than the transfer line 21L. Further, as indicated generally, second diluent 104 may be added to the fluff slurry 102. In some embodiments, the fluff slurry 102 contains relatively little or essentially no first diluent.

The liquid in the transfer slurry 21 sent to the decanter may overflow an upper portion of the decanter. In particular, the liquid such as first diluent may overflow into a conduit as a separated stream 106. In certain embodiments, the separated stream 106 may be recycled to the first reactor 50A. The separated stream 106 may include some carryover of fluff solids from the transfer slurry 21. Further, separated stream 106 may include dissolved or entrained hydrogen, ethylene, or comonomer.

The circulation pump 54A in the first loop reactor 50A may provide motive force for processing the transfer slurry 21 through the decanter, for transfer of the concentrated fluff slurry 102 to the second reactor 50B, and for recycle of the separated stream 106 to the first reactor 50A (such as to the suction side of the circulation pump 54A) or to a recovery system. Additionally, one or more pumps disposed external to the first loop reactor 50A may supplement the motive force provided by the circulation pump 54A.

The separation system 100 may employ a wash column in lieu of or in addition to the aforementioned decanter. In a wash column, diluent (e.g., first diluent) is used to "wash" the transfer slurry 21. The first diluent can be contacted with the transfer slurry in the wash column vessel. The fluff in the transfer slurry settles out the bottom of the wash column, and first diluent is taken off (e.g., overhead) from the wash column (e.g., as an overhead stream) as the separated stream 106.

In certain examples, the transfer slurry 21 enters a top portion of the wash column and flows down the column. Fresh diluent (e.g., first diluent) is introduced at a bottom portion of the column and flows upward in contact (e.g., countercurrent contact) with the transfer slurry. The fresh diluent displaces upward the diluent, unreacted monomer, and any unreacted comonomer and chain transfer agent in the transfer slurry to form the separated stream 106 discharging an overhead portion of the wash column. A fluff slurry stream 102 discharges a bottom portion of the wash column to the second reactor 50A, for example. The fluff slurry 102 has a lower amount of first diluent than introduced into the wash column with the transfer slurry 21 from the first reactor 50A. It should be noted that a decanter-like function within the wash column with the solids settling to the base of the column may facilitate formation of the separated stream 106 and the discharge of the fluff slurry stream 102.

The circulation pump 54A in the first loop reactor 50A may provide motive force for processing the transfer slurry 21 through the wash column, for transfer of the concentrated fluff slurry 102 to the second reactor 50B, and for recycle of the separated stream 106 to the first reactor 50A (such as to the suction side of the circulation pump 54A) or to a recovery system. Further, the diluent (e.g., first diluent) introduced to the wash column may provide motive force. Additionally, one or more pumps disposed external to the first loop reactor 50A may supplement the motive force provided by the circulation pump 54A.

In alternate embodiments, the separation system 100 may instead reduce the transfer slurry 21 in pressure in one or more steps, and flash and remove the first diluent (and light components) as the separated stream 106. A cyclone may facilitate the separation. For instance, a cyclone may be employed on the flashed vapor stream to remove fluff solids (e.g., fines) entrained in the vapor. The flashed separated stream 105 may or may not be compressed and recycled to a recovery or fractionation system, for example. The embodiments of the separation system 100 employing the pressure reduction step(s) and optionally a cyclone may discharge a concentrated fluff slurry 102 with reduced or substantially no first diluent to the second reactor 50B. A booster pump may be employed on the fluff solids slurry after such a pressure reduction. Moreover, as indicated, second diluent may be added to the fluff slurry 102 and/or added to the second reactor 50B.

Lastly, as mentioned, at least a portion of the separated stream 106 including first diluent may be sent to a recovery system including a fractionation system, for example. Further, as also discussed, the second diluent in the product slurry 22 discharging from the second reactor or terminal reactor may be flashed and recovered in a diluent/monomer recovery system 24. A portion of the recovered diluent may be condensed and directly recycled to the reactor system 20, and a portion sent to fractionation 30, for example. In all, the present techniques provide for fractionation systems if desired to process the separated stream 106 and the first diluent therein, and also process second diluent recovered downstream of the second reactor 50B. Moreover, the fractionation system(s) may be configured with fractionation columns and operating conditions to accommodate examples where the first diluent and/or second diluent are mixtures of diluents.

Figure 3:
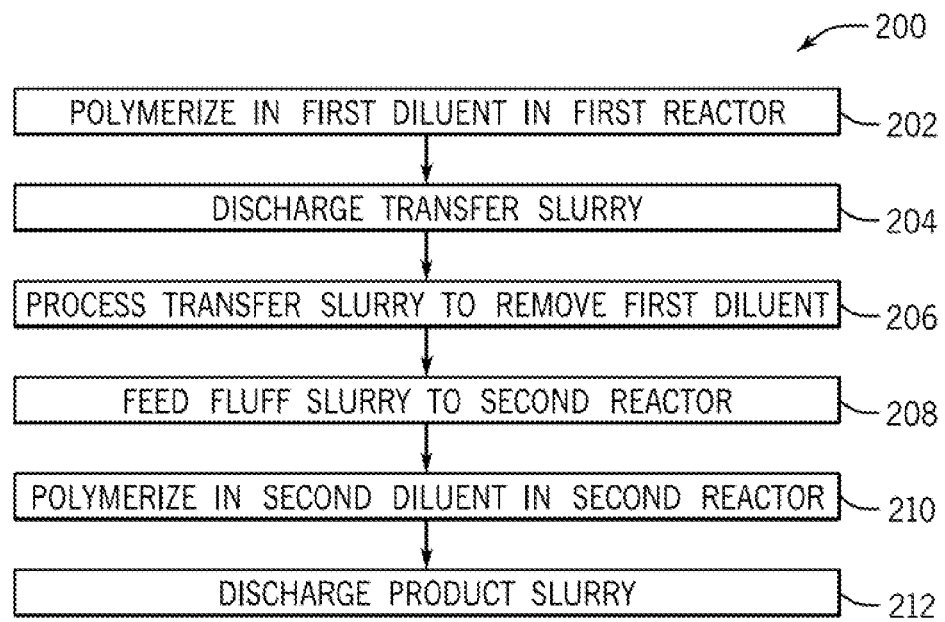
FIG. 3 is a block flow diagram of an exemplary method of operating a polyolefin reactor system, such as the reactor system of FIG. 2, in accordance with embodiments of the present techniques.

FIG. 3 is a method 200 for operating a polyolefin reactor system with two polymerization reactors (e.g., two loop reactors) operating in series, such as the exemplary reactor system 20 of FIGS. 1 and 2. A first diluent is employed in the first reactor 50A and a second diluent is employed in the second reactor 50B, wherein the first diluent is different than the second diluent. Further, a first polyolefin is polymerized in the first reactor 50A and a second polyolefin is polymerized in the second reactor 50B, wherein the first polyolefin may be different than the second polyolefin. The second polyolefin may be characterized either as the polyolefin polymerized in the second reactor 50B or as the total (product) polyolefin polymerized in the first and second reactors, depending on the convention chosen. Moreover, the method 200 may be implemented in a polyolefin reactor system 20 having capability to discharge the transfer slurry 21 from the first reactor 50A directly to the second reactor 50B, and/or to discharge the transfer slurry 21 from the first reactor 50A to the separation system 100

Initially, an olefin (e.g., ethylene or propylene) is polymerized (block 202) in the presence of a first diluent in the first reactor to produce a first (i.e., intermediate) polyolefin (e.g., polyethylene or polypropylene). A transfer slurry 21 including the intermediate polyolefin and the first diluent is discharged (block 204) from the first polymerization reactor. The transfer slurry is processed (block 206) to remove a portion or substantially all of the first diluent from the transfer slurry. A resulting fluff slurry having the intermediate (i.e., first) polyolefin is fed (block 208) to the second polymerization reactor.

The processing (block 206) of the transfer slurry may include sending the transfer slurry to a separation system 100 involving at least one of a hydrocyclone, wash column, or a decanter, as discussed above, to remove first diluent from the transfer slurry and give the resulting fluff slurry 102. In embodiments, the processing (block 206) may involve pressure reduction to flash the first diluent, and a cyclone in some examples, to remove the change transfer agent and give the fluff slurry sent to the second reactor.

The processing (block 206) via the separation system 100, for example, may reduce the amount of first diluent in the transfer slurry by about 20 weight % to about 100 weight % in certain examples, and discharges first diluent in the separated stream 106 (see FIG. 1). Thus, the fluff slurry 102 has a lower content of first diluent than in the transfer slurry 21. In some embodiments, the fluff slurry 102 has substantially no first diluent or only residual first diluent.

In certain examples, the fluff slurry 102 exiting the separation system 100 may be concentrated in fluff solids. Second diluent may be added to the fluff slurry and/or directly to the second reactor. Also, second diluent may be added in the separation system 100. Moreover, as indicated, the fluff slurry 102 may have little or no first diluent.

As discussed, a processed transfer slurry labeled as a fluff slurry with reduced or no first diluent (and having intermediate polyolefin formed in the first reactor 50A) is fed (block 208) to a second polymerization reactor 50B. An olefin is polymerized (block 210) in a second diluent in the second reactor 50B to form a product polyolefin. A product slurry 22 having the product polyolefin is discharged (block 212) from the second reactor. The product polyolefin may be a bimodal polyolefin, for instance. In a particular example, the intermediate (first) polyolefin formed in the first reactor 50A is a linear low-density polyethylene (LLDPE), and the product polyolefin discharged from the second reactor 50B has the LLDPE from the first reactor, and a second polyolefin such as high density polyethylene (HDPE) added in the second reactor.

IV. Solubility Factor

Figure 4:
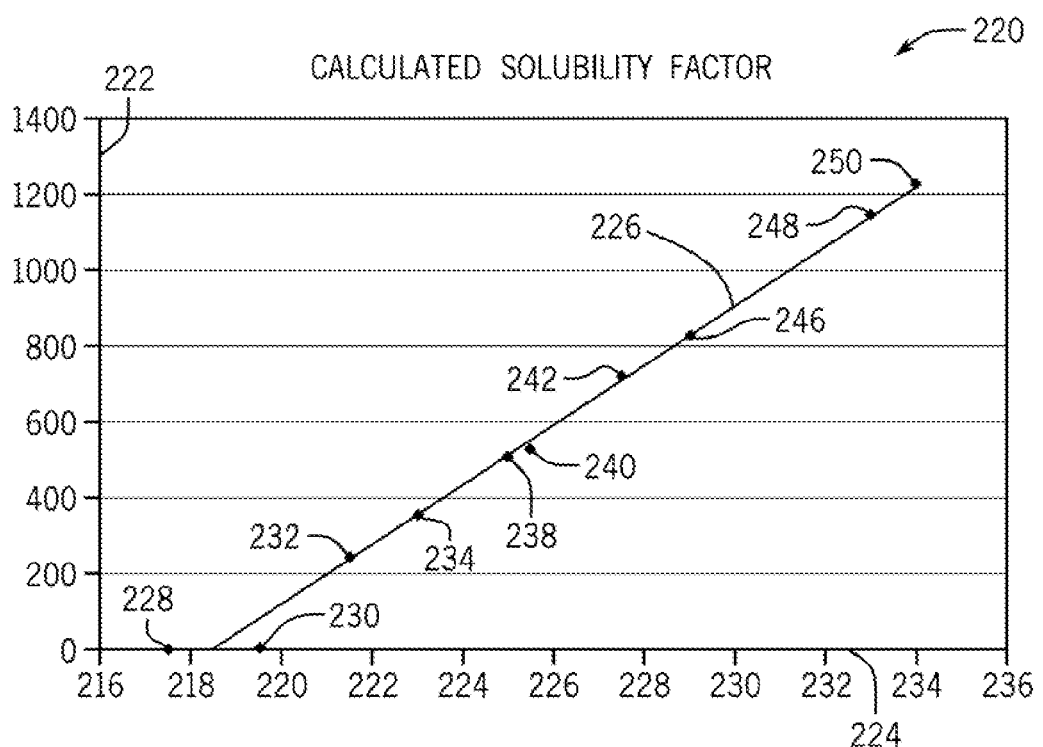
FIG. 4 is a plot of a calculated solubility factor versus maximum operating temperature in accordance with embodiments of the present techniques.

FIG. 4 is a plot 200 of a calculated solubility factor 222 (y-axis) of respective diluents versus the maximum reactor operating temperature 224 (x-axis) in ° F. of the respective diluents. The calculated solubility factor 222 on the y-axis is $V1(d1-d2)^2$, where V1 is the molal volume in g/mol, d1 is the Hildebrand solubility parameter of the diluent in $(MPa)^{1/2}$, and d2 is the Hildebrand solubility parameter of the polyolefin in $(MPa)^{1/2}$ which is taken here to be 16.5 $(MPa)^{1/2}$ for both polyethylene and polypropylene. Supporting data for FIG. 4 is given in Table 3 below.

TABLE 3

Calculated Solubility Factor

| Diluent | V1 -- Molal Volume (cc/mol) | Calculated Solubility Factor $V1(d1-d2)^2$ | Maximum Temperature (° F.) |
|---|---|---|---|
| neopentane | 76.4 | 1223 | 234 |
| propane | 43.4 | 626 | 233 |
| isobutane | 60.1 | 823 | 232 |
| iso-octane | 114.6 | 716 | 227.5 |
| isopentane | 72.2 | 526 | 225.5 |
| n-butane | 56.3 | 507 | 225 |
| n-pentane | 72.6 | 351 | 223 |
| n-hexane | 84.9 | 245 | 221.5 |
| cyclohexane | 83.7 | 3.3 | 219.5 |
| cyclopentane | 69.1 | 0.7 | 217.5 |

Solubility theory may assume a generally linear 226 relationship between the calculated solubility factor 222 versus the maximum reactor operating temperature 224 at which significant fouling is expected to occur. The calculated solubility factor, $V1(d2-d1)^2$, is a good comparison of polyolefin solubility. The diluents on the plot 200 in FIG. 4 are cyclopentane 228, cyclohexane 230, n-hexane 232, n-pentane 234, n-butane 238, isopentane 240, iso-octane 242, isobutane 246, propane 248, and neopentane 250.

While groupings may be arbitrary or unnecessary, the following exemplary groupings based on the calculated solubility factor can be made for two categories:

Category 1: neopentane, propane, isobutane, iso-octane
Category 2: n-butane, isopentane, n-pentane, n-hexane, cyclohexane, cyclopentane.

For four categories, more narrow or refined, exemplary grouping options based on the calculated solubility factor may include:

Category 1: neopentane, propane
Category 2: isobutane, iso-octane
Category 3: n-butane, isopentane, n-pentane
Category 4: n-hexane, cyclohexane, cyclopentane.

V. Conclusion

In summary, embodiments of the present techniques provide for a polyolefin reactor system including a first reactor configured to produce a first reactor discharge stream having a first polyolefin and a first diluent composition. The reactor system includes a second reactor configured to receive at least a portion of the first reactor discharge stream and to produce a second reactor discharge stream having a second polyolefin and a second diluent composition. The first reactor discharge stream may be fed to a separator (e.g., hydrocyclone or wash column) to remove at least a portion of the first diluent composition to form a first diluent recycle stream Other embodiments provide for a polyolefin reactor system including a first reactor configured to receive a first diluent and to produce a first reactor discharge having the first diluent and a first polyolefin (e.g., polyethylene). The reactor system includes a separator (e.g., hydrocyclone, wash column, decanter) that receives at least a portion of the first reactor discharge and to form (1) a recycle stream comprising the first diluent and (2) a separator product stream comprising the first polyolefin. The reactor system also includes a second reactor configured to receive a second diluent and the diluent separator product stream from the separator, and to produce a second reactor discharge having the second diluent and a second polyolefin (e.g., also polyethylene). In embodiments, at least a portion of the diluent recycle stream is recycled to the first reactor. In certain embodiments, the recycle stream is sent to a suction of a circulation pump of the first reactor. The recycle stream may consist essentially of first diluent. Lastly, a diluent feed system introduces first diluent to the first reactor and introduces the second diluent to at least one of the diluent separator, to the diluent separator product stream, or directly to the second reactor. The first polyolefin may have a different average molecular weight than the second polyolefin. For example, the second polyolefin has a higher average molecular weight than the first polyolefin. On the other hand, the second polyolefin has a lower average molecular weight than the first polyolefin. Further, the first and second polyolefin may have a different density. For example, the second polyolefin has a higher density than the first polyolefin. On the other hand, the second polyolefin has a lower density than the first polyolefin.

Further embodiments may include a polyolefin reactor system including a first polymerization reactor configured to polymerize olefin monomer in the presence of a first diluent, and to discharge continuously a transfer slurry comprising a first polyolefin and the first diluent. The reactor system includes a separation system configured to receive the transfer slurry and to discharge a recycle stream having the first diluent, and to discharge a fluff slurry having the first polyolefin. The reactor system includes a second polymerization reactor configured to receive the fluff slurry from the separation system, polymerize olefin monomer in the presence of a second diluent, and discharge a product slurry having a second polyolefin. The polyolefin reactor system may be configured to route the recycle stream to the first polymerization reactor or to a recovery system, or to both. In certain examples, the reactor system is configured to route the recycle stream to a suction of a circulation pump of the first polymerization reactor. Moreover, the reactor system may be capable to send the transfer slurry to the second polymerization reactor, bypassing the separation system. In certain embodiments, the first polyolefin is LLDPE, and the second polyolefin is a bimodal polyethylene having the first polyolefin and HDPE. In other embodiments, the first polyolefin is HDPE, and the second polyolefin is a bimodal polyethylene having the first polyolefin and LLDPE.

The present techniques may provide for a polymerization reactor system including a first loop reactor configured to polymerize olefin monomer in a first diluent to produce a first polyolefin, and to discharge continuously a transfer slurry having the first polyolefin and the first diluent. The reactor system includes a separation system configured to remove the first diluent from the transfer slurry, and to discharge a fluff slurry having the first polyolefin to a second loop reactor. The reactor system includes the second loop reactor configured to polymerize olefin monomer in a second diluent to produce a second polyolefin, and to discharge a product slurry including a product polyolefin (e.g., bimodal polyolefin) having the first polyolefin and the second polyolefin. The polymerization reactor system may be capable to discharge the transfer slurry from the first loop reactor to the second loop reactor, bypassing the separation system. As similarly discussed, the first polyolefin may include a LLDPE and the second polyolefin includes high density polyethylene HDPE, or the first polyolefin includes HDPE and the second polyolefin includes LLDPE. In more particular examples, the first polyolefin includes a low molecular-weight HDPE (LMW HDPE) and the second polyolefin includes a high molecular-weight LLDPE (HMW LLDPE), or the first polyolefin comprises HMW LLDPE and the second polyolefin comprises LMW HDPE.

The techniques may provide for a method of operating a polyolefin reactor system, including polymerizing olefin in a first diluent in a first reactor to form a first polyolefin, discharging continuously from the first reactor a transfer slurry having the first polyolefin and the first diluent, and processing the transfer slurry through a separator (e.g. including hydrocyclone, a wash column, or a decanter, or any combination thereof) to form (1) a recycle stream having the first diluent and (2) a fluff slurry having the first polyolefin. The method includes feeding the fluff slurry to a second reactor, polymerizing olefin in a second diluent in the second reactor to form a second polyolefin, and discharging from the second reactor a product slurry having first polyolefin, the second polyolefin, and the second diluent. The method may include sending the recycle stream to a recovery system having a fractionation system. The method may include recycling the recycle stream to the first reactor. In these methods, the first polyolefin may include LLDPE and the second polyolefin includes HDPE, or the first polyolefin includes HDPE and the second polyolefin includes LLDPE.

Lastly, the techniques may provide for a method of operating a polyolefin reactor system, including polymerizing olefin in a first diluent in a first reactor to form an intermediate polyolefin, and discharging continuously from the first reactor a transfer slurry having the intermediate polyolefin and the first diluent. The method includes processing the transfer slurry to remove first diluent and to provide a fluff slurry having the intermediate polyolefin and less first diluent than in the transfer slurry. The method includes feeding the fluff slurry to a second reactor, polymerizing olefin in a second diluent in a second reactor to form a product polyolefin (e.g., bimodal polyolefin), and discharging from the second reactor a product slurry having the product polyolefin. Processing the transfer slurry may include feeding the transfer slurry to a hydrocyclone that removes first diluent and discharges the fluff slurry. Processing the transfer slurry may include feeding the transfer slurry to a wash column or decanter. Processing the transfer slurry may include reducing pressure of the transfer slurry to flash first diluent in the transfer slurry. The intermediate polyolefin includes LLDPE and the product polyolefin includes the intermediate polyolefin and HDPE, or the intermediate polyolefin includes HDPE and the product polyolefin includes the intermediate polyolefin and LLDPE.

ADDITIONAL DISCLOSURE

Methods and systems for the production for polyethylene has been described. The following clauses are offered as further description:

Embodiment A

A polyolefin reactor system comprising: a first reactor configured to produce a first reactor discharge stream comprising a first polyolefin and a first diluent composition; and a second reactor configured to receive at least a portion of the first reactor discharge stream and to produce a second reactor discharge stream comprising a second polyolefin and a second diluent composition, wherein the second diluent composition is different than the first diluent composition.

Embodiment B

The polyolefin reactor system of embodiment A, wherein the first diluent composition and the second diluent composition comprise a different Hildebrand solubility parameter value.

Embodiment C

The polyolefin reactor system of embodiments A through B, wherein the first diluent composition and second diluent composition comprise a different boiling point.

Embodiment D

The polyolefin reactor system of embodiments A through C, wherein the first diluent composition and the second diluent composition comprise a different heat capacity.

Embodiment E

The polyolefin reactor system of embodiments A through D, wherein the first reactor discharge stream is fed to a separator to remove at least a portion of the first diluent composition to form a first diluent recycle stream.

Embodiment F

The polyolefin reactor system of embodiments A through E, wherein the separator is a hydrocyclone or a wash column.

Embodiment G

A polyolefin reactor system comprising: a first reactor configured to receive a first diluent and to produce a first reactor discharge comprising the first diluent and a first polyolefin; a separator configured to receive at least a portion of the first reactor discharge and to form (1) a recycle stream comprising the first diluent and (2) a separator product stream comprising the first polyolefin; a second reactor configured to receive a second diluent and the diluent separator product stream, and to produce a second reactor discharge comprising the second diluent and a second polyolefin; and wherein the first diluent is different than the second diluent.

Embodiment H

The polyolefin reactor system of embodiment G, wherein the first diluent comprises propane, isobutane, n-butane, neopentane, isopentane, n-pentane, cyclopentane, n-hexane, cyclohexane, n-heptane, iso-octane, or n-octane, or any combination thereof.

Embodiment I

The polyolefin reactor system of embodiments G through H, wherein the second diluent comprises propane, isobutane, n-butane, neopentane, isopentane, n-pentane, cyclopentane, n-hexane, cyclohexane, n-heptane, iso-octane, or n-octane, or any combination thereof.

Embodiment J

The polyolefin reactor system of embodiments G through I, wherein at least a portion of the diluent recycle stream is recycled to the first reactor.

Embodiment K

The polyolefin reactor system of embodiments G through J, wherein the recycle stream is sent to a suction of a circulation pump of the first reactor.

Embodiment L

The polyolefin reactor system of embodiments G through K, wherein the separator is a hydrocyclone.

Embodiment M

The polyolefin reactor system of embodiments G through L, wherein the separator comprises a wash column.

Embodiment N

The polyolefin reactor system of embodiments G through M, wherein the separator comprises a decanter.

Embodiment O

The polyolefin reactor system of embodiments G through N, wherein the recycle stream comprises at least 90 weight percent of first diluent.

Embodiment P

The polyolefin reactor system of embodiments G through O, comprising a diluent feed system configured to introduce first diluent to the first reactor and second diluent to at least one of the diluent separator, the diluent separator product stream, or directly to the second reactor.

Embodiment Q

The polyolefin reactor system of embodiments G through P, wherein the second polyolefin has a higher average molecular weight than the first polyolefin, or wherein the second polyolefin has a lower average molecular weight than the first polyolefin, and wherein average molecular weight comprises a weight average molecular weight or a number average molecular weight.

Embodiment R

The polyolefin reactor system of embodiments G through Q, wherein the second polyolefin has a higher density than the first polyolefin, or wherein the second polyolefin has a lower density than the first polyolefin.

Embodiment S

The polyolefin reactor system of embodiments G through R, wherein the first and second polyolefins are polyethylene.

Embodiment T

A polyolefin reactor system comprising: a first polymerization reactor configured to polymerize olefin monomer in the presence of a first diluent, and to discharge continuously a transfer slurry comprising a first polyolefin and the first diluent; a separation system configured to receive the transfer slurry and to discharge a recycle stream comprising the first diluent, and to discharge a fluff slurry comprising the first polyolefin; and a second polymerization reactor configured to receive the fluff slurry from the separation system, polymerize olefin monomer in the presence of a second diluent, and discharge a product slurry comprising a second polyolefin, wherein the second diluent is different than the first diluent.

Embodiment U

The polyolefin reactor system of embodiment T, wherein the first diluent has a boiling point at 1 atmosphere greater than 0° C., and the second diluent has a boiling point at 1 atmosphere less than 0° C.

Embodiment V

The polyolefin reactor system of embodiments T through U, wherein the second diluent has a different calculated solubility factor than the first diluent.

Embodiment W

The polyolefin reactor system of embodiments T through V, wherein the first polyolefin comprises linear low-density polyethylene (LLDPE), and the second polyolefin is a bimodal polyethylene comprising the first polyolefin and high density polyethylene (HDPE), or wherein the first polyolefin comprises HDPE, and the second polyolefin is a bimodal polyethylene comprising the first polyolefin and LLDPE.

Embodiment X

The polyolefin reactor system of embodiments T through W, wherein the polyolefin reactor system is configured to route the recycle stream to the first polymerization reactor or to a recovery system, or to both.

Embodiment Y

The polyolefin reactor system of embodiments T through X, wherein the polyolefin reactor system is configured to route the recycle stream to a suction of a circulation pump of the first polymerization reactor.

Embodiment Z

The polyolefin reactor system of embodiments T through Y, wherein the polyolefin reactor system is capable to send the transfer slurry to the second polymerization reactor, bypassing the separation system.

Embodiment AA

A polymerization reactor system comprising: a first loop reactor configured to polymerize olefin monomer in a first diluent to produce a first polyolefin, and to discharge continuously a transfer slurry comprising the first polyolefin and the first diluent; a separation system configured to remove the first diluent from the transfer slurry, and to discharge a fluff slurry comprising the first polyolefin to a second loop reactor; the second loop reactor configured to polymerize olefin monomer in a second diluent to produce a second polyolefin, and to discharge a product slurry comprising a product polyolefin having the first polyolefin and the second polyolefin; and wherein the first diluent is different than the second diluent.

Embodiment AB

The polyolefin reactor system of embodiment AA, wherein the first diluent has a different density than the second diluent.

Embodiment AC

The polyolefin reactor system of embodiments AA through AB, wherein the product polyolefin comprises a bimodal polyolefin.

Embodiment AD

The polyolefin reactor system of embodiments AA through AC, wherein the first polyolefin comprises linear low-density polyethylene (LLDPE) and the second polyolefin comprises high density polyethylene (HDPE), or wherein the first polyolefin comprises HDPE and the second polyolefin comprises LLDPE.

Embodiment AE

The polyolefin reactor system of embodiments AA through AD, wherein first polyolefin comprises a low molecular-weight high-density polyethylene (LMW HDPE) and the second polyolefin comprises a high molecular-weight linear low-density polyethylene (HMW LLDPE), or the first polyolefin comprises HMW LLDPE and the second polyolefin comprises LMW HDPE.

Embodiment AF

The polyolefin reactor system of embodiments AA through AE, wherein the polymerization reactor system is capable to discharge the transfer slurry from the first loop reactor to the second loop reactor, bypassing the separation system.

Embodiment AG

A method of operating a polyolefin reactor system, comprising: polymerizing olefin in a first diluent in a first reactor to form a first polyolefin; discharging continuously from the first reactor a transfer slurry comprising the first polyolefin and the first diluent; processing the transfer slurry through a separator to form (1) a recycle stream comprising the first diluent and (2) a fluff slurry comprising the first polyolefin; feeding the fluff slurry to a second reactor; polymerizing olefin in a second diluent in the second reactor to form a second polyolefin; discharging from the second reactor a product slurry comprising the first polyolefin, the second polyolefin, and the second diluent; and wherein the first diluent and the second diluent are different.

Embodiment AH

The method of embodiment AG, comprising sending the recycle stream to a recovery system comprising a fractionation system.

Embodiment AI

The method of embodiments AG through AH, comprising recycling the recycle stream to the first reactor.

Embodiment AJ

The method of embodiments AG through AI, wherein the first diluent and the second diluent comprise different Hildebrand solubility parameter values.

Embodiment AK

The method of embodiments AG through AJ, wherein the first diluent and the second diluent comprise different boiling points.

Embodiment AL

The method of embodiments AG through AK, wherein the first polyolefin comprises linear low-density polyethylene (LLDPE) and the second polyolefin comprises high density polyethylene (HDPE), or wherein the first polyolefin comprises HDPE and the second polyolefin comprises LLDPE.

Embodiment AM

The method of embodiments AG through AL, wherein the separator comprises a hydrocyclone, a wash column, or a decanter, or any combination thereof.

Embodiment AN

A method of operating a polyolefin reactor system, comprising: polymerizing olefin in a first diluent in a first reactor to form an intermediate polyolefin; discharging continuously from the first reactor a transfer slurry comprising the intermediate polyolefin and the first diluent; processing the transfer slurry to remove first diluent and to provide a fluff slurry comprising the intermediate polyolefin and less first diluent than in the transfer slurry; feeding the fluff slurry to a second reactor; polymerizing olefin in a second diluent in a second reactor to form a product polyolefin; discharging from the second reactor a product slurry comprising the product polyolefin; and wherein the first diluent and the second diluent are different.

Embodiment AO

The method of embodiment AN, wherein the product polyolefin is a bimodal polyolefin.

Embodiment AP

The method of embodiments AN through AO, wherein the intermediate polyolefin comprises linear low-density polyethylene (LLDPE) and the product polyolefin comprises the intermediate polyolefin and high density polyethylene (HDPE), or wherein the intermediate polyolefin comprises HDPE and the product polyolefin comprises the intermediate polyolefin and LLDPE.

Embodiment AQ

The method of embodiments AN through AP, wherein processing the transfer slurry comprises feeding the transfer slurry to a hydrocyclone

Embodiment AR

The method of embodiments AN through AQ, wherein processing the transfer slurry comprises feeding the transfer slurry to a wash column or decanter.

Embodiment AS

The method of embodiments AN through AR, wherein processing the transfer slurry comprises reducing pressure of the transfer slurry to flash first diluent in the transfer slurry.

What is claimed is:

1. A method of operating a polyolefin reactor system, comprising:
   polymerizing olefin in a first inert diluent in a first reactor to form a first polyolefin;
   discharging continuously from the first reactor a transfer slurry comprising the first polyolefin and the first inert diluent;
   processing the transfer slurry through a separator to form (1) a recycle stream comprising the first inert diluent and (2) a concentrated slurry comprising the first polyolefin;
   feeding the concentrated slurry to a second reactor;
   polymerizing olefin in a second inert diluent in the second reactor to form a second polyolefin;
   discharging from the second reactor a product slurry comprising the first polyolefin, the second polyolefin, and the second inert diluent; and
   wherein the first inert diluent and the second inert diluent are different, wherein process the transfer slurry comprises feeding the transfer slurry to a wash column or decanter.

2. The method of claim 1, comprising sending the recycle stream to a recovery system comprising a fractionation system.

3. The method of claim 1, comprising recycling the recycle stream to the first reactor.

4. The method of claim 1, wherein the first inert diluent and the second inert diluent comprise different Hildebrand solubility parameter values.

5. The method of claim 1, wherein the first inert diluent and the second inert diluent comprise different boiling points.

6. The method of claim 1, wherein the first polyolefin comprises linear low-density polyethylene (LLDPE) and the second polyolefin comprises high density polyethylene (HDPE), or wherein the first polyolefin comprises HDPE and the second polyolefin comprises LLDPE.

7. The method of claim 1, wherein the separator comprises a hydrocyclone, a wash column, or a decanter, or any combination thereof.

8. A method of operating a polyolefin reactor system, comprising:
   polymerizing olefin in a first inert diluent in a first reactor to form an intermediate polyolefin;
   discharging continuously from the first reactor a transfer slurry comprising the intermediate polyolefin and the first inert diluent;
   processing the transfer slurry to remove first inert diluent and to provide a concentrated slurry comprising the intermediate polyolefin and less first inert diluent than in the transfer slurry;
   feeding the concentrated slurry to a second reactor;
   polymerizing olefin in a second inert diluent in a second reactor to form a product polyolefin;
   discharging from the second reactor a product slurry comprising the product polyolefin; and
   wherein the first inert diluent and the second inert diluent are different, wherein process the transfer slurry comprises feeding the transfer slurry to a wash column or decanter.

9. The method of claim 8, wherein the product polyolefin is a bimodal polyolefin.

10. The method of claim 8, wherein the intermediate polyolefin comprises linear low-density polyethylene (LLDPE) and the product polyolefin comprises the intermediate polyolefin and high density polyethylene (HDPE), or wherein the intermediate polyolefin comprises HDPE and the product polyolefin comprises the intermediate polyolefin and LLDPE.

11. The method of claim 8, wherein processing the transfer slurry comprises feeding the transfer slurry to a hydrocyclone.

12. The method of claim 8, wherein processing the transfer slurry comprises reducing pressure of the transfer slurry to flash first diluent in the transfer slurry.

* * * * *